United States Patent
Helmick et al.

(10) Patent No.: US 11,531,590 B2
(45) Date of Patent: Dec. 20, 2022

(54) METHOD AND SYSTEM FOR HOST-ASSISTED DATA RECOVERY ASSURANCE FOR DATA CENTER STORAGE DEVICE ARCHITECTURES

(71) Applicant: Western Digital Technologies, Inc., San Jose, CA (US)

(72) Inventors: Daniel Lee Helmick, Broomfield, CO (US); Cory James Peterson, Kasson, MN (US); Jay Sarkar, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 342 days.

(21) Appl. No.: 16/739,098

(22) Filed: Jan. 9, 2020

(65) Prior Publication Data
US 2021/0081273 A1    Mar. 18, 2021

Related U.S. Application Data

(60) Provisional application No. 62/901,697, filed on Sep. 17, 2019.

(51) Int. Cl.
*G06F 11/00* (2006.01)
*G06F 11/10* (2006.01)
(Continued)

(52) U.S. Cl.
CPC ........ *G06F 11/108* (2013.01); *G06F 9/30189* (2013.01); *G06F 9/4881* (2013.01);
(Continued)

(58) Field of Classification Search
CPC ............... G06F 11/108; G06F 11/1004; G06F 11/1044; G06F 11/1068
See application file for complete search history.

(56) References Cited

U.S. PATENT DOCUMENTS 7,139,942 B2    11/2006    Subramanian et al.
7,917,803 B2 *    3/2011    Stefanus ............. G06F 12/0246
                                                                711/149
(Continued)

FOREIGN PATENT DOCUMENTS

JP          H1049448 A      2/1998

OTHER PUBLICATIONS

Douglas Gilbert; NVM Express: SCSI Translation Reference; NVM Express Workgroup, Revsion 1.5; https://nvmexpress.org/wp-content/uploads/NVM_Express_-_SCSI_Translation_Reference-1_5_20150624_Gold.pdf, Jun. 24, 2015 (94 pages).

(Continued)

*Primary Examiner* — Elmira Mehrmanesh
(74) *Attorney, Agent, or Firm* — Patterson & Sheridan, LLP; Steven H. VerSteeg

(57) ABSTRACT

A method of error management includes, in response to a read request for first data from a first storage device of a plurality of storage devices under one or more common data protection schemes, receiving a read uncorrectable indication regarding the first data, obtaining uncorrected data and metadata of an LBA associated with the first data, and obtaining the same LBA from one or more other storage devices of the plurality. The method further includes comparing the uncorrected data with the data and metadata from the other storage devices, speculatively modifying the uncorrected data based, at least in part, on the other data to create a set of reconstructed first data codewords, and, in response to a determination that one of the reconstructed first data codewords has recovered the first data, issuing a write_raw command to rewrite the modified data and associated metadata to the first storage device.

20 Claims, 13 Drawing Sheets

(51) Int. Cl.
  *G06F 11/07* (2006.01)
  *G06F 12/02* (2006.01)
  *G06F 9/48* (2006.01)
  *G06F 9/30* (2018.01)
  *G06F 11/30* (2006.01)

(52) U.S. Cl.
  CPC ...... *G06F 11/0772* (2013.01); *G06F 11/1068* (2013.01); *G06F 11/3037* (2013.01); *G06F 12/0246* (2013.01); *G06F 2212/7207* (2013.01)

(56) References Cited

U.S. PATENT DOCUMENTS

| | | | |
|---|---|---|---|
| 8,145,941 B2* | 3/2012 | Jacobson | G06F 11/1076 714/6.24 |
| 8,417,987 B1* | 4/2013 | Goel | G06F 11/1076 714/6.22 |
| 8,438,455 B2* | 5/2013 | Vogan | G06F 11/1048 714/764 |
| 8,799,745 B2 | 8/2014 | Koseki | |
| 8,832,524 B2 | 9/2014 | Bennett | |
| 9,569,306 B1* | 2/2017 | Camp | G06F 11/1012 |
| 10,289,500 B2* | 5/2019 | Hands | G06F 11/1662 |
| 10,312,943 B2* | 6/2019 | Lesartre | G11C 29/52 |
| 10,552,243 B2* | 2/2020 | Pletka | G06F 11/108 |
| 10,795,590 B2* | 10/2020 | Huang | G11C 29/82 |
| 2010/0058141 A1 | 3/2010 | Fukase | |
| 2013/0290618 A1 | 10/2013 | Werner et al. | |
| 2015/0186210 A1 | 7/2015 | Tsai | |
| 2018/0011762 A1* | 1/2018 | Klein | G11C 29/52 |
| 2018/0314594 A1* | 11/2018 | Yamamoto | H03M 13/2906 |
| 2019/0042369 A1 | 2/2019 | Deutsch et al. | |
| 2019/0114217 A1 | 4/2019 | Pletka et al. | |
| 2019/0121690 A1 | 4/2019 | Klein | |

OTHER PUBLICATIONS

Iyswarya Narayanan et al.; "SSD Failures in Datacenters: What? When? and Why?", Empirical SSD UBER, https://www.microsoft.com/en-us/research/wp-content/uploads/2016/08/a7-narayanan.pdf; 2016 (11 pages).

Cloudian Whitepaper, "Modern Enterprise Data Protection with Cloudian" https://2sq7d632aduy7flhh6iaxnby-wpengine.netdna-ssl.com/wp-content/uploads/2018/01/Cloudian-Data-Protection-Whitepaper.pdf (6 pages).

Neal R. Mielke et al.; "Reliability of Solid-State Drives Based on NAND Flash Memory" Proceedings of the IEEE, vol. 105, No. 9, Sep. 9, 2017; pp. 1725-1750.

Wasabi Technologies, Inc; "Wasabi Extremely High Durability Protects Mission-Critical Data", Wasabi Tech Brief https://s3.wasabisys.com/wsbi-media/wp-content/uploads/2018/10/Wasabi_Durability_Tech_Brief.pdf; 2018 (7 pages).

Yu Cai et al.; "Error Characterization, Mitigation, and Recovery in Flash-Memory-Based Solid-State Drives", Proceedings of the IEEE, vol. 105, No. 9, Sep. 9, 2017; pp. 1666-1704.

International Search Report and Written Opinion issued in corresponding International Patent Application No. PCT/US2020/023186, dated Jul. 8, 2020 (15 pages).

\* cited by examiner

```
                                                                    500
┌─────────────────────────────────────────────────────────────┐
│ While reading data distributed across a plurality of SSDs   │  510
│ spanning one or more data center(s), receiving, at a host   │
│ of an SSD, an indication of a read uncorrectable event on   │
│ the SSD                                                     │
└─────────────────────────────────────────────────────────────┘
                              │
                              ▼
┌─────────────────────────────────────────────────────────────┐
│ Issue, by the host, a read_raw command to obtain data and   │  520
│ error correction code (ECC)/error detection code (EDC)      │
│ metadata of LBA(s) causing the uncorrectable error at SSD   │
└─────────────────────────────────────────────────────────────┘
                              │
                              ▼
┌─────────────────────────────────────────────────────────────┐  530
│ Obtain, by the host, the same LBA(s) from one or more       │◄──┐
│ other SSDs of the plurality of SSDs                         │   │
└─────────────────────────────────────────────────────────────┘   │
                              │                                   │
                              ▼        540                        │
                    ◇ Are there sections of ◇                     │
                  ◇ mismatching bits between the ◇                │
                ◇ read_raw data that can be used to ◇─── No ──────┘
                ◇ speculatively correct the errant ◇
                  ◇ bits of the read uncorrectable? ◇
                              │
                             Yes
                              ▼
┌─────────────────────────────────────────────────────────────┐
│ Speculatively exchange unmatching bits in multiple          │  545
│ combinations using the data and metadata obtained from one  │
│ or more of the other SSDs                                   │
└─────────────────────────────────────────────────────────────┘
                              │
                              ▼
┌─────────────────────────────────────────────────────────────┐
│ Issue, by the host, a write_raw command to re-write the     │  550
│ corrected/speculatively corrected data and metadata to      │
│ appropriate LBA(s)                                          │
└─────────────────────────────────────────────────────────────┘
                              │
                              ▼
┌─────────────────────────────────────────────────────────────┐
│ Read back, by the host, relevant data at the SSD to         │  555
│ validate its correctness                                    │
└─────────────────────────────────────────────────────────────┘
                              │
                              ▼
┌─────────────────────────────────────────────────────────────┐
│ Rewrite to other SSDs of the plurality of SSDs              │  560
└─────────────────────────────────────────────────────────────┘
```

FIG. 5A

METHOD AND SYSTEM FOR HOST-ASSISTED DATA RECOVERY ASSURANCE FOR DATA CENTER STORAGE DEVICE ARCHITECTURES

CROSS-REFERENCE TO RELATED APPLICATIONS

This application claims the benefit of U.S. Provisional Application 62/901,697 filed on Sep. 17, 2019 (the "Provisional"), which is incorporated by reference herein in its entirety.

BACKGROUND OF THE DISCLOSURE

Field of the Disclosure

Embodiments of the present disclosure generally relate to bit error correction in storage devices, and in particular to methods and systems for host-assisted data recovery assurance for data center storage device architectures.

Description of the Related Art

Prior approaches to data center data recovery design have either failed to successfully leverage economic designs, or have designed data centers with high data replication and/or erasure coding resource budgets in order to achieve high durability with high volume deployments. It is known that consumer class storage devices, e.g., solid state devices (SSDs) including non-volatile NAND memory often evidence an unrecoverable bit-error rate (UBER) of from 1e-11 to 1e-14. This is orders of magnitude greater than the general UBER specifications provided by manufacturers of 1e-15 to 1e-17. Thus, it is often difficult to ensure an UBER specification for economic or consumer SSD designs that may be leveraged by data-centers. This leads to noted performance issues, inasmuch as the host/infrastructure is now required to correct errant storage device(s) with high UBER in a manner that was not planned for.

In addition, a trend has developed to remove drive parity from designs and increasingly rely on data mirroring, such as, for example, 3-way mirroring. Removing parity at the storage device level, for example in a NAND based SSD, reduces the costs of the SSD, as it devotes more of the raw NAND cells to user accessible space. However, it remains an open question as to how many data mirrors are then required to maintain data durability.

SUMMARY OF THE DISCLOSURE

The present disclosure generally describes a method of error management for data storage devices, such as solid-state storage devices (SSDs). The method includes, in response to a read request for data that is distributed across a plurality of storage devices, receiving a read uncorrectable indication regarding the data relating to a first storage device of the plurality, issuing a read_raw command to obtain data and metadata of the logical block address (LBA) associated with the errant data, and obtaining the same LBA, or the same user data stored at another LBA, from one or more other storage devices of the plurality of storage devices. The method further includes comparing the errant data with the data and metadata from the other storage devices, and, in response to a determination that the data obtained from the other storage devices is sufficient to one of correct or speculatively correct the errant data, modifying the errant data, and issuing a write_raw command to rewrite the modified data and associated metadata to the first storage device.

In one embodiment, the method further includes, in response to a determination that the reconstructed first data codewords cannot recover the first data, obtaining the same LBA, or the same user data stored at another LBA, from one or more additional other storage devices of the plurality.

In one embodiment, the method further includes rewriting the modified data and metadata to at least one of: one or more other storage devices of the plurality of storage devices, or a RAM buffer.

In one embodiment, the method still further includes, in response to a determination that the first data cannot be corrected at the LBA level, issuing a read_raw_extended command to obtain data and metadata having a size larger than a logical block that is associated with the first data, from one or more other storage devices of the plurality.

The present disclosure further generally describes a non-volatile data storage device. The non-volatile storage device includes a storage device host configured to receive a read uncorrectable event response for a first codeword (CW) stored in the storage device and issue a read_raw command for the CW and a read_raw extended command for each of other CWs protected in a data protection stripe that includes the first CW. The host is further configured to construct a pseudo_read_raw result for the first CW from each of the other CWs and the data protection stripe, and, using the pseudo_read_raw result, construct a set of possible replacement CWs for the first CW and push one or more elements of the set to the storage device.

The present disclosure still further generally describes an apparatus. The apparatus includes means for receiving an indication of uncorrectable data in response to a read command regarding first data stored on a first SSD of a first data center, means for issuing a read_raw command to obtain data and metadata of one or more LBAs in which the uncorrectable data is stored, and means for issuing a read_raw_extended command to obtain the data and metadata of one or more LBAs from one or more other SSDs ("other data"), the other SSDs being either in the first data center or in other data centers, wherein the first and the other data centers are part of at least one of a RAID protected, erasure coded, or replicated system. The apparatus still further includes means for speculatively correcting the first data using the other data, and means for issuing a write_raw command to re-write the speculatively corrected data to the first SSD, in response to receiving an indication that the speculatively corrected data recovered the first data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A illustrates a process flow diagram of a method 500 for identifying and correcting errant bits stored in a SSD, in accordance with various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Data centers desire solutions to the data reliability problem. They need to recover data for uncorrectable reads, as well as for failed drives. In various embodiments according to the present disclosure, this problem may be solved using methodical host-assisted correction. Embodiments according to the present disclosure may be embodied in, or in a part of, a future standard. It is noted that embodiments of the present disclosure may be implemented in either a host or an SSD, for example. However, in some embodiments it is more efficient to implement such embodiments in an SSD, to minimize hardware duplications into the host.

In embodiments according to the present disclosure, high data durability may be sought by host-assisted leveraging of replicated data and/or erasure coding redundancy, for economical SSD designs. It is noted that a current industry standard design of SSDs with an UBER of 1e-17 or 1e-15 requires a SSD internal redundant array of independent disks (RAID)/exclusive or (XOR) design to enable data durability. In such designs, data recovery is accomplished, for example, by calculating the XOR of the information recorded on the other drives, or, for example, in common RAID implementations, by calculating higher order parity values. For future economic SSD designs that do not include internal RAID and higher raw bit error rate (RBER) media, data durability becomes challenging, or even impossible.

Figure 1:
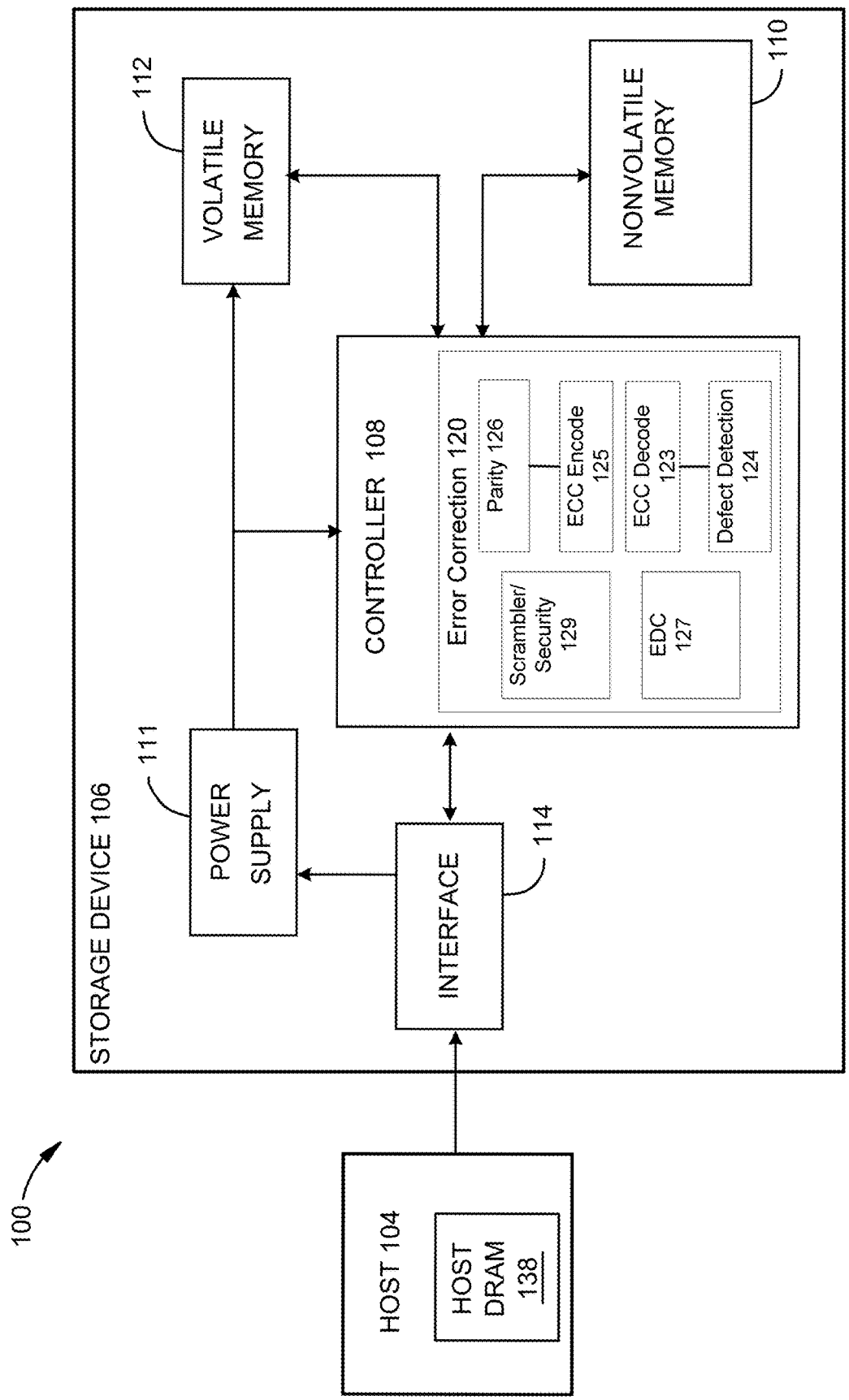
FIG. 1 is a schematic block diagram illustrating a storage system, according to one embodiment.

To provide context regarding the implementation of various embodiments, next described is an example storage system, in accordance with such embodiments, with reference to FIG. 1. FIG. 1 illustrates a schematic block diagram of a storage system 100. Storage system 100 includes storage device 106, which may function as a storage device for a host device 104, in accordance with one or more embodiments. For example, host device 104 may utilize non-volatile memory devices 110 included in storage device 106 to store and retrieve data. Host device 104 comprises a host DRAM 138. In some examples, storage system 100 may include a plurality of storage devices, such as storage device 106, which together may operate as a storage array. For example, storage system 100 may include a plurality of storage devices 106 configured as a redundant array of inexpensive/independent disks (RAID) that collectively function as a mass storage device for host 104.

Continuing with reference to FIG. 1, host device 104 may store and/or retrieve data to and/or from one or more storage devices, such as storage device 106. As shown, host device 104 may communicate with storage device 106 via interface 114. Host device 104 may comprise any of a wide range of devices, including computer servers, network attached storage (NAS) units, desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, and the like.

Storage device 106 includes a controller 108, non-volatile memory (NVM) 110, power supply 111, volatile memory 112, and, as noted above, interface 114. The storage device 106 includes a controller 108, which may manage one or more operations of the storage device 106. For instance, the controller 108 may manage the reading of data from and/or the writing of data to the NVM 110. The controller 108 may comprise zone management 120 to manage read and writes to zones, as well relocation of valid data to and from zones for garbage collection purposes. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110.

In embodiments, controller 108 includes error correction 120. Error correction 120 includes various modules, including an error correction code (ECC) encode module 125. ECC encode module 125 may be coupled to parity module 126, as shown. Additionally, error correction 120 also includes an ECC decode module 123, which is coupled to defect detection 124. Finally, error correction 120 includes a scrambler/security module, and error detection coding (EDC) 127. In alternate embodiments, scrambler/security 129 may be divided into two separate modules, one for scrambler, and the other for security.

In some examples, storage device 106 may include additional components not shown in FIG. 1 for sake of clarity. For example, storage device 106 may include a printed circuit board (PCB) to which components of the storage device 106 are mechanically attached, and which includes electrically conductive traces that electrically interconnect components of the storage device 106, or the like. In some examples, the physical dimensions and connector configurations of storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), non-volatile memory express (NVMe), OpenCAPI, GenZ, Cache Coherent Interface Accelerator (CCIX), Open Channel SSD (OCSSD), Coherent Accelerator (CXL), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 of storage device 106 may receive power from host device 104 via interface 114.

In embodiments, storage device 106 includes NVM 110, which may include a plurality of memory devices. In embodiments, NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (e.g., a plurality of memory devices), as described below in connection with FIG. 2A. In some examples, each of the memory devices may be configured to store relatively large amounts of data, such as, for example, 128 MB, 256 MB, 512 MB, 1 GB, 2 GB, 4 GB, 8 GB, 16 GB, 32 GB, 64 GB, 128 GB, 256 GB, 512 GB, 1 TB, etc.

In some examples, each memory device of NVM 110 may include any type of NVM devices, such as, for example, flash memory devices, phase-change memory (PCM) devices, resistive random-access memory (ReRAM) devices, magnetoresistive random-access memory (MRAM) devices, ferroelectric random-access memory (F-RAM), holographic memory devices, hard disk drives (HDD), and any other type of non-volatile memory devices Continuing with reference to FIG. 1, NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). In embodiments, controller 108 may write data to, and read data from, NAND flash memory devices at the page level and erase data from NAND flash memory devices at the block level.

Storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to the NVM 110. As illustrated in FIG. 1, volatile memory 112 may consume power received from the power supply 111.

Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Various embodiments according to the present disclosure relate to storage devices in data centers. Each such storage device may function as a storage device for a host device, in accordance with such embodiments, and there may be an interface between the host device and the storage device. The interface may include one or both of a data bus for exchanging data with the host device as well as a control bus for exchanging commands with the host device. The interface may operate in accordance with any suitable protocol. For example, the interface may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

In embodiments, the storage device includes NVM which may include a plurality of memory devices. In some embodiments, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each media unit of the NVM may include any type of non-volatile memory devices, such as, for example, flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

As noted, in some embodiments, the NVM may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), which includes two levels, triple level cell (TLC), or quad level cell (QLC). Data may be written to and read from NAND flash memory devices at the page level and data may be erased from NAND flash memory devices at the block level.

Figure 2A:
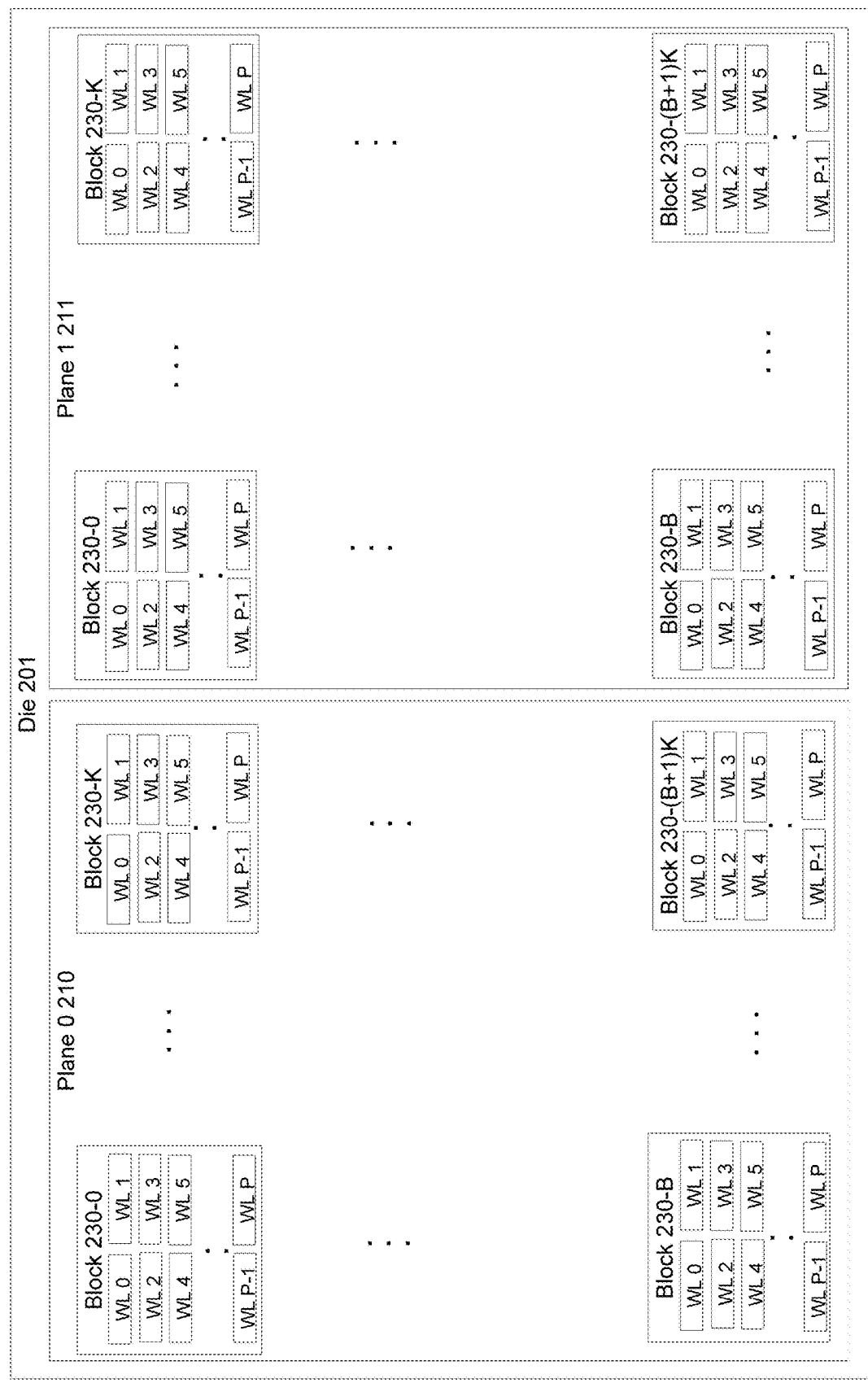
FIG. 2A illustrates an example NAND memory device, showing various groupings of memory elements on a die.

As noted above, NAND flash memory is generally organized in a grid. FIG. 2A illustrates an example NAND flash memory, showing the organizational hierarchy of elements. NAND flash memory cells are housed within NAND chips. The layout of a NAND chip, or a die, consists of four areas. These are, with reference to FIG. 2A, in descending order of size, a die 201, a plane 210, 211 a block 230 and a wordline (WL) 240. FIG. 2A illustrates how these four areas are organized on an example NAND chip. With reference thereto, the largest element is die 201. Semiconductor wafers are cut from a block of electronic-grade silicon. The piece of wafer cut from the block is referred to as a die. A die contains from one to two planes. Within die 201 of FIG. 2A are shown two planes, plane 0 210 and plane 1 211. Generally, planes can execute identical operations together. Planes contain varying numbers of blocks 230. Blocks are a useful designator because NAND flash cells can only be erased at the block level, It is for this reason that a block is sometimes known as a "minimum erase unit" or an "erase block unit."

In the example of FIG. 2A, in each plane 210 and 211 there are B rows of blocks, starting at a top row that begins with block 130-0, and ending at a bottom row that begins with block 130-B. Each row of blocks has K blocks in it, resulting in each plane having B rows and K columns. Thus, the first row ends with block 230-K, and the last row ends at block 230-(B+1)K. Thus, in this example, each of plane 0 210 and plane 1 211 have a total of (B+1)K blocks, Additionally, in this example, each block 230 has P WLs as shown, beginning in the upper left of each block with WL 0, and ending in the bottom right of each block with WL P. As noted above, P may be, for example 128 or 256, or other higher multiple of two. Alternatively, in other embodiments, P may also be a number that is not a power of two. Although this detail is not shown in FIG. 2A, each WL is composed of pages. As noted above, in embodiments, memory cells may be single level cells (SLCs), where each cell stores on bit, or multi-level cells (MLCs), where each cell stores many bits. Thus, in such embodiments, while a SLC would have one page, an MLC would have two, an upper page (UP) and a lower page (LP). A TLC has three pages, adding a middle page (MP) to the LP and UP, and so on.

Figure 2B:
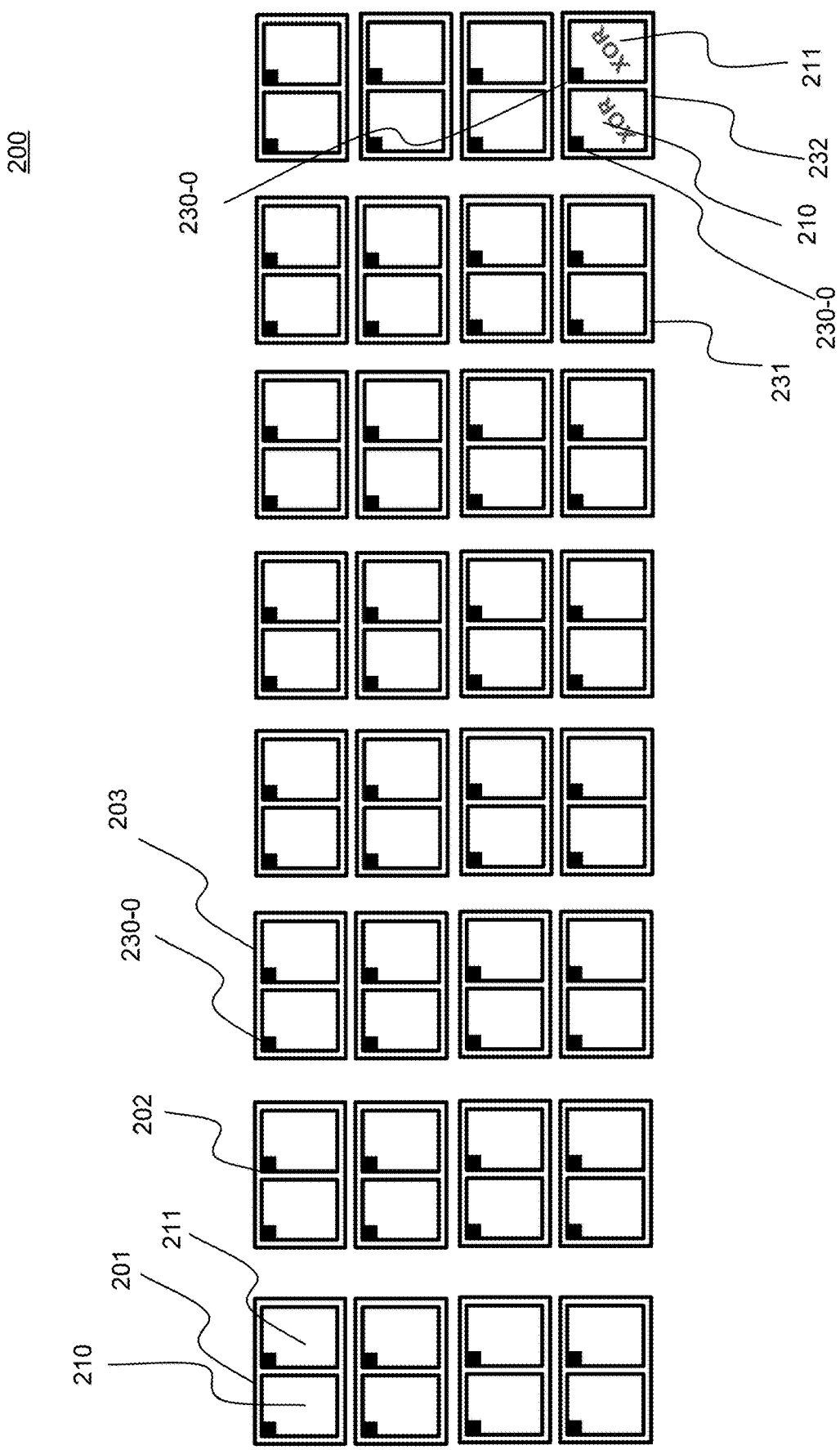
FIG. 2B illustrates an exemplary collection of NAND memory dies such as are shown in FIG. 2A, arranged with Exclusive-OR (XOR) parity protection, in an SSD, in accordance with various embodiments.

FIG. 2B illustrates an exemplary collection of dies in a grouping of NAND dies, in accordance with various embodiments. With reference thereto, there are shown 32 dies, numbered, beginning at the top left, as dies 201 through 232 at the bottom right of FIG. 2B, each of the type shown in FIG. 2A, for example. Accordingly, the 32 dies shown in FIG. 2B each have two planes 210 and 211, and, as described above, each plane includes several blocks 230. These blocks, for convenience, may be numbered as 230-0 through 230-(B+1)*K, where (B+1)*K is the total number of blocks per plane, as described with reference to FIG. 2A. Moreover, the 32 dies 201 through 232 of FIG. 2B are mutually protected by using one of the dies, here die 232, to store, block by block, an XOR result of the other 31 dies. Thus, die 232 does not store any additional data, but rather metadata about the data stored in each of dies 201-231. In the depicted example, die 232 stores in the first block of its plane 210 the result of an XOR operation on all of the blocks 230-0 of the respective plane 210's of each of the other 31 dies. Further, it stores in the first block of its plane 211 the result of an XOR operation on all of the blocks 230-0 of the respective plane 111's of each of the other 31 dies. This is illustrated by the shaded block 230-0 shown in each upper left corner of each plane 210, 211 of each of the 32 dies in FIG. 2B. While the first block of each plane of each die in FIG. 2B is used as an illustration, an analogous XOR result is also stored in each plane of die 232 for each of the corresponding blocks 230-1 through 230-(B+1)*K. Thus, each plane of die 232 is used solely for storing XOR data of the corresponding plane of the other 31 dies, on a respective block by block basis.

Figure 2C:
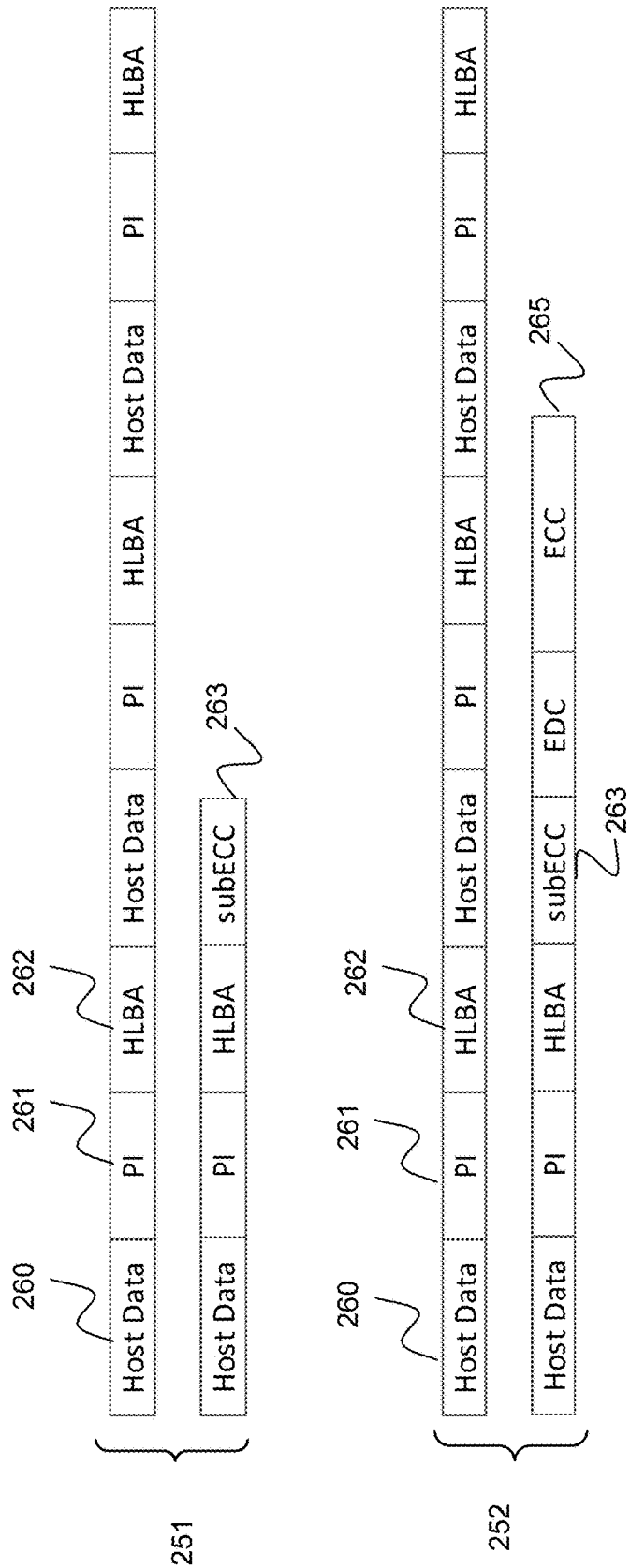
FIG. 2C illustrates an exemplary codeword, in accordance with various embodiments.

FIG. 2C illustrates an example codeword, in accordance with various embodiments. In embodiments, in each drive, various codewords are stored. Codewords, also known as "ECC codewords", include user data and metadata, and a number of bits generated by ECC. Thus, as used herein, a codeword is a unit of data stored on a NAND that is composed of user original data, SSD specific metadata, error detection coding (EDC) bits, and ECC bits. Thus, as used herein, a codeword is a unit of data stored on a NAND that is composed of user original data, SSD specific metadata, error detection coding (EDC) bits, and ECC bits. In embodiments, the sizing and interlacing of these components may be widely variable. Some ECC encoding algorithms scramble the user data such that it cannot be read without decoding the ECC codeword. Other ECC encoding algorithms, for example, allow for reading of the user data without decoding.

With reference to FIG. 2C, although broken up into four separate lines, what is shown is a single codeword. The codeword includes eight blocks of host data 260, each block having 512B of data. Following each block of host data there is an 8B bock of protection information (PI) 261. There are several standards for PI, as known in the art. These include, for example, DIF, DIX, and PI (types I, II, III). Following each PI block 261 is a host logical block address block (HLBA) 262. The HLBA may also describe, for example, the NVMe Namespace (used as a sentinel value of expected decode and check for match). In the example of FIG. 2C, the codeword has been divided into two portions 251 and 252, each having four blocks of host data. Each of these sub-codewords has an optional subECC block 263, as shown. A subECC block 263 is an optional very interior ECC over the 2 kB of data in each of sub-codewords 251 and 252.

Finally, at the end of the codeword there is an ECC block 265, a standard expected outer ECC that includes EDC and both sub-codewords. It is here noted that what is shown above is a "Systematic ECC". This is discussed in greater detail below.

Some examples provided in this disclosure focus on internal drive XOR as one example of outer codeword protection of user data. However, in other examples, other internal drive protection schemes may also be implemented, embodiments according to the present disclosure are thus understood to equally apply to drives using any internal protection scheme. For example, such other example internal drive protection schemes that cross erase blocks, planes or die boundaries include, but are not limited to, Erasure Codes or large ECC schemes that create a new outer ECC codeword over two or more sub-ECC codewords (sometimes called internal codewords). In some examples, the two internal ECC codewords are placed on two different dies and accessed in parallel to reduce latency.

In embodiments, a codeword may be composed of many different elements in many different configurations. For example, the codeword may contain the original user data, a host logical block address (LBA), protection information (PI), and EDC metadata of the LBA associated with the uncorrectable error and also log the LBA's physical address. It is noted that EDC varieties include, for example, cyclical redundancy coding (CRC) or internal sentinel values with predicted decode values such as the host LBA of the data. Various ECC possibilities include, but are not limited to, the ECC method (Low Density Parity Check (LDPC) codes, Reed-Solomon codes, and Bose-Chaudhuri-Hocquenghem (BCH) codes). The layout of the parts may be differ, and some implements may choose ECC implementations that are systematic or non-systematic ECC, where systematic ECC enables a separation of ECC from other parts, and non-systematic ECC may mingle the parts and make them effectively inseparable without successful decoding of the data and ECC.

It is here noted that, depending on drive implementation choices, certain steps or processes disclosed herein may need to be skipped or altered. For example, some drives will scramble the data to ensure that repetitive user data will not increase the probability of disturbances due to read disturb, program disturb, correlated bit drift. Sometimes the scrambling may be removed due to it being a function of available information. For example the scrambling may be a function of the written host LBA. Thus, in these implementations a "read_raw" command has a choice of removing the scrambling prior to returning the codeword. As noted below in detail, implementations that cannot remove the HLBA will be restricted to locating data on other drives at the same HLBA enclosure.

It is also noted that drive security is generally assumed to be turned off for ease of description of the various examples. However, it is possible to implement embodiments according to the present disclosure with drive security enabled. When drive security is enabled, it should be assumed the data is in an unlocked state or that appropriate keys and decoding algorithms are applied depending on the security implementation.

Drive implementations that use some implementations of non-systematic ECC will be restricted to using no HLBA or HLBAs that are the same location. Otherwise the convolution of the bit positioning will not enable direct comparisons of sections of the codewords.

In embodiments, high data durability may be achieved by host-assisted leveraging of replicated data and/or erasure coding redundancy. Embodiments according to the present disclosure utilize the new commands: "read_raw" and "write_raw", described in detail below. According to some embodiments, these may be added to the NVMe standard, open-channel related standards, SAS, or other storage interface standard to enable error management in future designs across other interfaces and storage devices such as HDDs.

In embodiments, high data durability may be achieved as follows. Upon encountering an uncorrectable bit error event, a host may use a "read_raw" command to obtain data and metadata as described above.

Upon receiving the data pursuant to the read_raw command, the host then compares the original erroneous data (from the uncorrectable bit error event) along with ECC/EDC by pulling the same user data from other SSDs in a data center's replicated, RAIDed, or erasure coded system, to deduce relevant specific bits in error. Thereafter, the host attempts to correct the errant bits using ECC/EDC, metadata and copies of blocks from other SSDs. In embodiments, even if all of the copies of the same data objects (both in the local data center as well as in remote data centers) are corrupted, which is a very unlikely scenario, a correction of the data objects may still be effected via guided and intelligent speculative retries. Thereafter, in embodiments, the host saves the corrected block's predicted data to the original SSD (e.g., the one that first triggered the uncorrectable event) by using a "write_raw" command that includes the corrected data and new speculatively exchanged data.

The write_raw command is a newly defined command that may write data into the drive. This newly written data may be programmed to the NVM used by the storage device with any additional ECC, scrambling, media handling, or other additional overheads. Alternatively the data associated with the write_raw command may be held by the storage device in an alternative buffer region such as SRAM or DRAM. These buffers are optionally power fail protected by means beyond the scope of this disclosure. While examples according to the present disclosure utilize the term write_raw to define a new command, the manipulation of the data failing to receive correction and the exchange of the information is at the core of embodiments according to the present disclosure. Therefore, write_raw could, in an alternate embodiment, refer to a process of writing the same data from the host into the drive's controller memory buffer (CMB) or persistent memory region (PMR), for example. In such an example embodiment, the same operations on the CMB and PMR would need to be occurring. However, there may be additional information commands or registers to resolve potential race conditions between the host and the drive. In another embodiment, the write_raw does not need to happen to the drive at all. If the host has sufficient knowledge to implement ECC decode, EDC checks, and other optional data manipulations from the drive's read recovery path, then the host may execute all of the steps of the read recovery path on the data that would be written in the write_raw path down to the drive. That is to say, the host may replicate the drive's recovery path to test for data correction and recovery.

In some embodiments, the write_raw command will need to re-apply scrambling or security on the ingest path of the write_raw data. This will enable correct reading of the data through the standard read data path without skipping such engines.

Following execution of the write_raw, the host then reads the relevant data back to validate its correctness and rewrites the constructed/corrected data to other hosts in the various data centers, if necessary, such as, for example, hosts of SSDs that also have the data object in question as erroneous.

It is noted that the new commands, read_raw and write_raw, are focused on intercepting the interior codewords. Beyond that however, in embodiments, two additional related commands are also introduced, termed "read_raw_extended" and "write_raw_extended", which are focused on intercepting data at the NAND groupings layer.

Thus, a read_raw_extended command obtains data and metadata beyond the size of a block and the associated host Logical Block Addresses (LBAs) of such user data. Thus, a read_raw_extended obtains, for example, an entire RAID stripe within a SSD protecting against data loss across multiple physical dies, or, for example, some or all of an entire erasure code block, to enable correction of data (of size larger than a logical block) by leveraging replicated data at other nodes in the erasure coded or data center environment.

In embodiments, this additional piece of information is needed to query the correct LBAs on other drives. This is because not every drive will have internal XOR stripes that are composed of the exact same LBAs. Thus, when the other drives are queried for their data, it may be needed to query for the LBAs here rather than their read_raw_extended."

To summarize the relevant sequence of events according to such embodiments, it is assumed, for example, that a first drive, say "Drive 1", returns an uncorrectable or erroneous chunk of data, such as an LBA or collections thereof. A read_raw_extended from Drive 1 is performed, and the LBAs associated with the read_raw_extended list is read and correction is attempted. Then, an write_raw_extended back into Drive 1 is performed, where the correct data for the entire XOR stripe is written, except for any so far unrecoverable problem LBA(s). Finally, "Drive 1" is directed to recover the problem LBA(s) using its built-in recovery mechanism while leveraging the additional data, metadata and information resulting from the read_raw_extended command.

In embodiments, this process may be performed for every drive in the scope of the replicated and/or erasure coded data center. Generally speaking, the chances of success on one of such drives are good. Once one such success happens, then it is likely that the unrecoverable data may be fully recovered.

Various embodiments according to the present disclosure may also be applied or implemented in parallel to existing schemes to achieve current or higher levels of data durability in data centers, and/or provide additional means for achieving high data durability. Such existing schemes may include, for example, data center replication and erasure coding schemes. It is also noted that outside the drive there may also be an enclosure level scheme, and thus, such existing schemes may also include enclosure level replication, erasure codes, and redundant array of independent discs (RAID). While RAID tends to be uncommon at a data center scale, it is common in the enclosure level.

It is noted that a SSD error/defect management stack may be designed as successive layers of protection against intrinsic Non-Volatile Memory (NVM) data errors and defects throughout the useful life of SSDs in deployment. Distributed data layout across NVM blocks and dies leverage uncorrelated and independent failure probabilities. As noted above, emerging SSD architectures and standards need a low Uncorrectable Bit Error Rate (UBER) despite reduced design margins in error management and increasing Raw Bit Error Rates (RBER) of NAND in internal SSD design.

To ensure robust data center SSD designs with a reduced occurrence (better) UBER than the usual 1e-15 (consumer) to 1e-17 (enterprise) for SSD designs, in embodiments, the following process may be implemented. Upon encountering an uncorrectable bit error event of one or more logical block addresses (LBAs), a host, for example, disposed in a data center, may use a "read_raw" command to obtain data, ECC, EDC bits and metadata (collectively a "codeword") of the block(s) causing the uncorrectable error, and log the block's or blocks' address(es). In embodiments the host may then compare the errant data, ECC, EDC, and metadata with the same block(s) it has pulled from other storage devices that are part of the data center's replicated or erasure coded system, to deduce relevant specific bits in error. In embodiments, the host may then attempt to correct the identified errant bits using data and ECC/EDC metadata obtained from the other storage devices, or from yet additional other storage devices that are also part of the data center's replicated or erasure coded system, for the identified blocks at the one or more LBAs.

In embodiments, this process may be successful even if all of copies of the same data object are corrupted. In embodiments, the host may subsequently send the corrected block's predicted data to the errant host by using a "write_raw" command that includes both corrected data and newly calculated error correction metadata. In embodiments, the host may then perform a read of the same memory location, to test/verify the correction of the errant data. Finally, in embodiments, the host may rewrite the reconstructed/corrected data, as needed, at associated copy locations across an overall erasure coded/replicated system.

Thus, in embodiments according to the present disclosure, data center data durability may be improved and reduced in frequency using a methodical, transparent and standards-aligned means for data centers to achieve high data durability from future SSD designs. Details of how, in such embodiments, this may be accomplished, using data both from within the local data center where the errant data is stored, as well as data from other remote data centers that are in a mutual mirroring relationship with the local data center, are next described with reference to FIGS. 3A through 7.

Figure 3A:
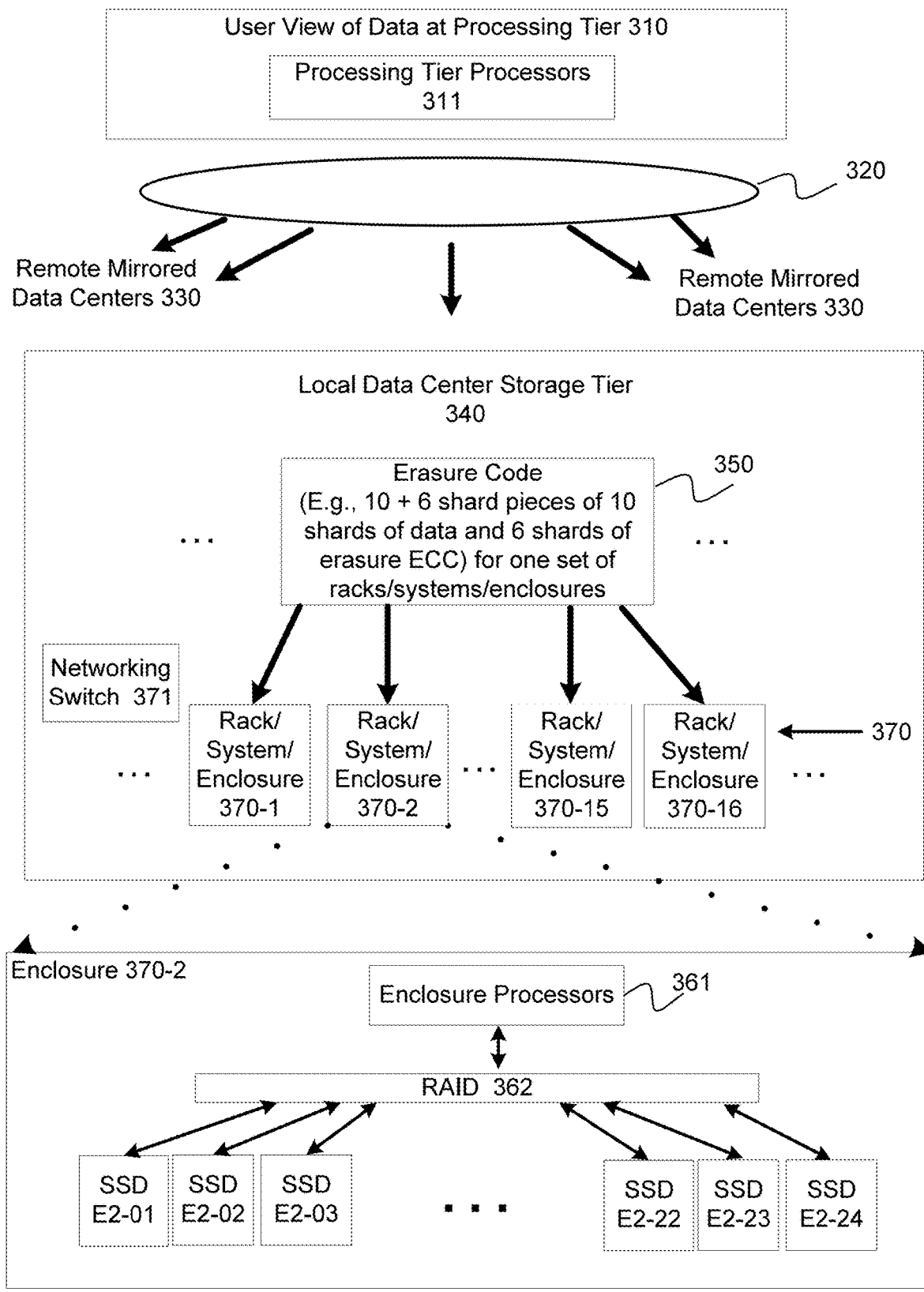
FIG. 3A illustrates an example user's view of data stored in a mirroring relationship over a set of data centers, in accordance with various embodiments.

FIG. 3A illustrates an example user's view of data stored in a collection of data centers involved in a mutual mirroring relationship, from high level to low level, in accordance with various embodiments. With reference thereto, beginning at the top of FIG. 3A, block 310 shows the user's high level view of the data at a processing tier of a data center. In general, a data center is divided into a processing tier, which, for example, runs applications directed to customer services and online interactions, and a storage tier where data is stored, which the various applications access in the course of operations. Some of the data in the storage tier is data that needs to be served to a consumer accessing an application, such as, for example, a user of an online sales platform entering a search for an item or category of item. Within the processing tier there are processing tier processors 311. Processing tier processors 311 run the applications described above. Moreover, in some embodiments, processing tier processors 311 perform methods according to the present disclosure to correct errant data through various means. In some embodiments this is performed by processing tier processors acting on their own, and in other embodiments these tasks are performed in conjunction with other processors such as, for example, networking switch 371, and enclosure processors 361, of one example enclosure, of an example rack. It is thus understood that methods according to the present disclosure may be implemented in various different hardware configurations, both with and without distributed responsibility for performing those methods among several processors, switches, or the like.

Continuing with reference to FIG. 3A, in embodiments, the user data view 310 includes a set of mirrored data centers 320. Some of the mirrored data centers 320 may be local, such as, for example, local data center 340 described below, or they may be at one or more remote locations, indicated by remote mirrored data centers 330. It is noted that in embodiments according to the present disclosure, the failure rate may be reduced at the point indicated by oval 320, e.g., at the level of multiple various mirrored data centers, by potentially returning corrected data at a more local mirror prior to the time it takes for a mirror that is far away to return such data.

Continuing with reference to FIG. 3A, as noted one of the mirrored data centers 320 is local data center storage tier 340. For example, there may be a 3-way mirroring system, and in such case local data center 340 is one of three nodes of a mirror, where the other two nodes may be, for example, remote from it. Within local data center storage tier 340 is provided an erasure code module 350, which shards the user data and applies ECC to it prior to programming it, as indicated by arrow 355, to various racks/systems/enclosures 370 of local data center 340. For example, the ECC coding may involve a 10+6 shard piece schema, where 10 shard pieces of data are protected with an additional 6 shards of erasure ECC, and then the 16 shards are respectively stored to each of the 16 enclosures 370-1 through 370-16, as shown. The erasure code shown protects the 16 enclosures as depicted. It is noted that an erasure code takes a "message," such as a data file, and makes a longer message in a way that the original can be reconstructed from the longer message even if parts of the longer message have been lost. In local data center 340 there may be hundreds of other sets of racks/systems/enclosures that are each protected by their own erasure code module and shard scheme. It is noted that, in embodiments, an erasure code may be in the form of, for example, Tornado codes, Fountain codes or Raptor codes. It is noted that erasure codes and ECC codes may sometimes be viewed interchangeably. The nuance is that erasure codes are datacenter and enclosure level deployment emphasized and ECC is inside the drive emphasized. However, it is noted, ECCs may alternatively be performed at the data center and enclosure levels, while erasure codes may be similarly be provided inside a drive.

Moreover, it is noted that RAID is a smaller subset of Erasure Codes. Moreover, while RAID has many different implementations, as used herein RAID 4 or RAID 5 is intended. It is also noted, however, that mirroring is RAID 1. Thus, mirroring is the most limited derivative case.

It is noted that, as shown, erasure code module 350 covers a block of 16 shards which is distributed across 16 racks/systems/enclosure 370. This is only one of many similar erasure code blocks that may be provided within local data center storage tier 340. Networking switch 371, also shown in local data center 340, is responsible for connectivity between various racks/systems/enclosures 370 within the local data center, as well connectivity between local data center and other remote data centers 330 that may be involved in the mirroring relationship. Due to that responsibility, in some embodiments, methods according to the present disclosure may be implemented in networking switch 371, to both pull data from other racks/systems/enclosures 370 covered by the same erasure coding block 350 as a given individual rack/system/enclosure, as well as to pull data from other remote data centers. As noted above, in some embodiments networking switch 371 may perform such tasks on its own, or in conjunction with other hardware, such as, for example, processing tier processors 311 and/or enclosure processors 361.

The example erasure coding shown in FIG. 3A, which contains 10 data shards and 6 code shards, is only one embodiment. Other embodiments may, for example, have different numbers of data and code shard fragments. Some EC implementations choose to implement interior EC recovery schemes with local code shard fragments, and larger global exterior code shard fragments. By way of further example, some of these EC schemes may be described as (12, 2, 2), where 12 is the number of data shards, 2 is the number of local code shards, and 2 is the number of global code shards. The global code shards are generally stored more remotely in order to reduce the exposure probability of losing local data and global data concurrently.

Continuing still further with reference to FIG. 3A, within each rack/system/enclosure of a set of related racks/systems/enclosures 370 there may be, for example, one motherboard with several, e.g., 2-4, high powered processors that perform various applications, such as, for example, those that serve data, webpages, etc. to respond to requests from processing tier 310, as well as other applications that do other work of the storage tier of local data center 340. In data center 240, for example, there may be many racks, each rack filled with various systems or enclosures. For ease of illustration, the bottom tier in this data hierarchy, enclosure 370-2 is shown, it being understood that there may be layers of racks and other systems above it, or that there may be racks and systems that operate in the same way as enclosure 370-2. Thus, in one or more embodiments what is described is a data recovery operation under mirroring, EC and RAID, to illustrate the versatility of implementation at different layered sub-system choices.

With reference to enclosure 370-2, as shown, the processors 361 of each rack/system/enclosure 370, for example, may be connected to several drives (SSDs), such as, for example, 24 SSDs, as shown within enclosure 370-2, which is, as noted, shown as an example representative of the 16 racks/systems/enclosures 370-1 through 370-16 protected by erasure code module 350 of local data center 340. In embodiments, the 24 SSDs of enclosure 370-2 may have a local RAID, as shown, or may have erasure coding, or mirroring provided over the top of them, external to the 24 SSD drives (not shown). This redundancy/mirroring may be done by the several processors 361, or for example, by a host bus adapter (HBA), or via other means. To cover various scenarios, FIG. 3A refers to, in the alternative, racks, systems and enclosures. It is noted that generally various enclosures may be provided in a single "rack", which generally represents a higher level of abstraction than an "enclosure." For example, in embodiments, a data center may include many, many sets of "enclosures", each enclosure having its own processing hardware, and each set of enclosures provided in a "rack." Data centers may have hundreds, or even thousands, of racks. Methods according to the present disclosure may be implemented in, and performed by, any of such possible configurations, within hardware at any level of the data center hierarchy.

Continuing further with reference to FIG. 3A, enclosure 370-2 includes enclosure processors 361, and a RAID system 362 that provides redundancy protection for drives SSD E2-01 through SSD E2-24. As noted above, in embodiments, in each drive various codewords are stored. Codewords, include user data and metadata, and a number of bits generated by ECC.

In some examples, scrambling is optionally applied before performing the ECC encoding and then the programming on a NAND, and in other examples scrambling may occur after the ECC encoding is performed. Scrambling may be implemented in a linear in and out, so that it can be applied and striped easily. In embodiments, either case may be utilized. In embodiments where scrambling is used, read_raw and write_raw commands would need to be consistent in removing the scrambling, or not removing the scrambling, depending on implementation choices during deployment. In implementations where scrambling is not removed, the storage devices contributing additional unreadable data would need to match the scrambling algorithm. Generally this is done by using the same SSD vendor and same generation of SSD. It is also noted that in some examples codewords may optionally have security encryption applied. Encryption may be one of several variants such as, for example, TCG, AES, FIPS, and many other choices.

The codeword may have one or more of its bits in error. When a codeword is read, for example by enclosure processors 361, from one of the SSDs E2-01 through E2-24, the codeword is first ECC decoded. That decoding by the ECC can fail. It if does, a failed read, or "read uncorrectable" is returned. However, in embodiments, even if the read succeeds, there still may be one or more bits of the codeword that have flipped. Therefore, in embodiments, if the ECC decoding succeeds, the codeword is then checked by error detection coding (EDC), which may itself detect a miscorrection. If there is such a failure, either at the ECC or the EDC layer, then it is necessary to go outside of the given SSD, and utilize the RAID protection within the enclosure, that is provided across all of the SSDs E2-01 through E2-24. In some embodiments, RAID 362 of enclosures 370 may be RAID 6, for example. If the RAID system within a specific enclosure (or other intra-enclosure mirroring or erasure coding schemes) also fails to produce a valid codeword, this is referred to in this disclosure as a "read uncorrectable." In embodiments, when that occurs, processing moves to upper layers in the data hierarchy, such as, for example, where multiple racks/systems/enclosures are used to mutually protect data, such as is shown in local data center 340, via the erasure coding 350 applied across multiple entities 370, where, for example, a 10+6 shard schema is used.

In embodiments, in the event of a failed read even at the level of entities 370, methods according to the present disclosure may be applied in parallel at upper layers, e.g., the various other mirroring nodes included in remote mirrored data centers 330. By this parallel action, in embodiments, failure rates diminish as one moves up the data center hierarchy shown in FIG. 3A. It is noted that a local data center may have erasures done within itself, as shown, and, for example, although generally not standard practice, one or both of mirroring and RAID may be implemented at the local data center level as well (not shown).

In embodiments, data from other SSDs used to correct a failed read at a first SSD, whether the other SSDs are at a lower layer, such as within enclosure 370-2, or at a higher layer, such as, for example, from one or more of rack/system/enclosures 370-1 and 370-3 through 370-16, or for example, from one of remote mirrored data centers 330, may or may not have the relevant data needed for the correction at a same LBA as the first SSD. This is because the SSDs in all of these related data centers, or even within one data center, or even within one enclosure of a local data center, may not be uniform, and thus, may not use the same HLBAs as the first SSD. Thus, in embodiments, the data from the other SSDs may be read either from the same LBA as the first SSD, or data corresponding to the data at the first SSD may be read from one or more other LBAs, from one or more of the other SSDs, as the case may be.

Figure 3B:
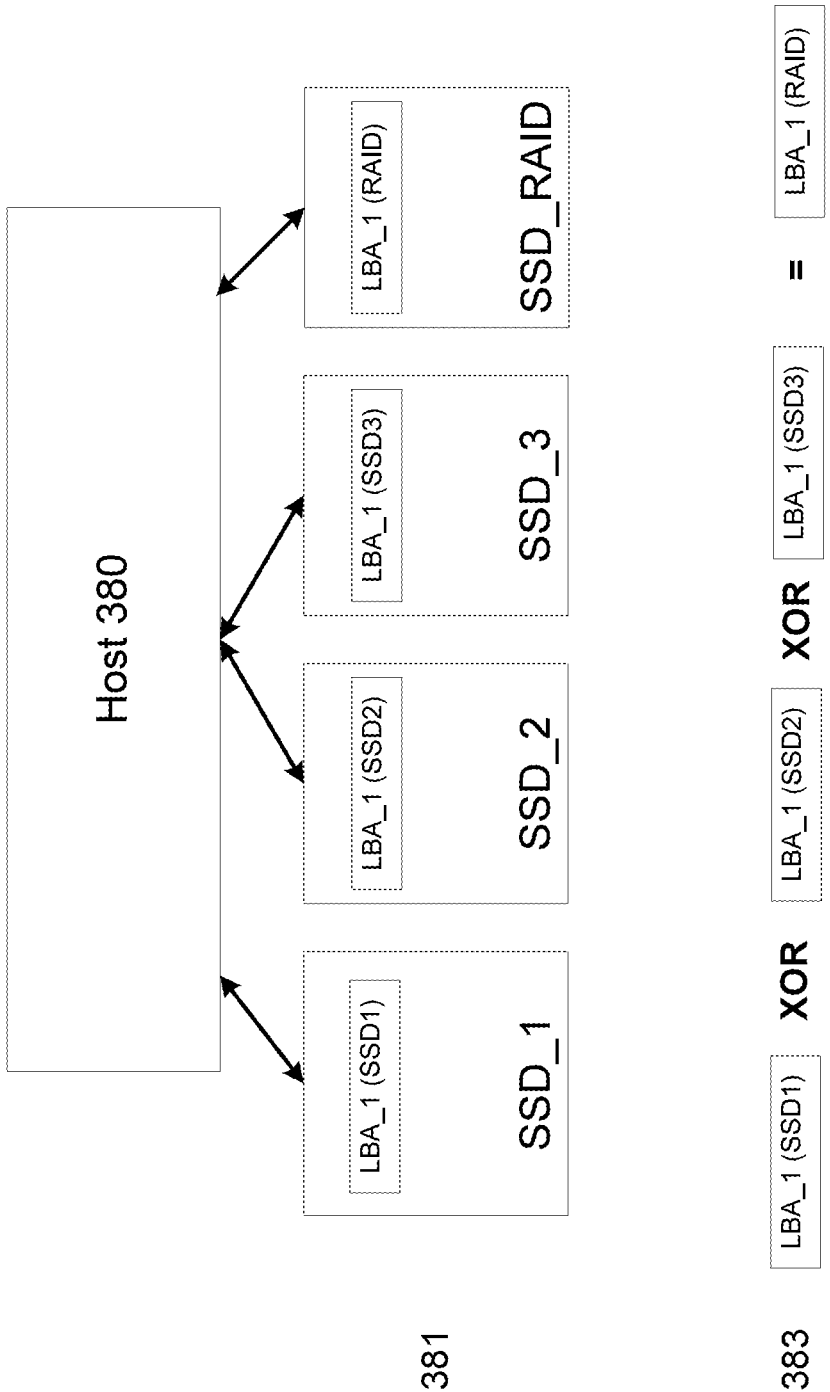
FIG. 3B illustrates an example host redundant array of inexpensive disks (RAID) recovery flow, in accordance with various embodiments.

FIG. 3B illustrates detail of a host RAID recovery flow, in accordance with various embodiments. With reference to FIG. 3B, there are shown three different sets of data, each at LBA_1, for each of the individual SSDs 381, being SSD_1, SSD_2, SSD_3, and SSD_RAID. This set of SSDs 381 is analogous to the Enclosure 370-2 of FIG. 3A, except that in FIG. 3B there are only four total SSDs. As shown at 383, if one XORs each of the three sets of data (at each LBA_1) from the three respective SSDs, namely SSD_1, SSD_2 and SSD_3, together, then one obtains the full XOR value, and that is stored at LBA_1 of the RAID SSD, or "LBA_1 (RAID)." The same LBA number (LBA_1) is selected for this example in order to align more of the codeword metadata. This will be further described in the context of FIG. 5D.

In embodiments, recovery of a single uncorrectable read proceeds as follows. For example, host 380 first reads LBA_1 from SSD_1, and obtains a read uncorrectable. Then the host 380 reads LBA_1 from each of the other SSDs, being each of SSD_2, SSD_3, and SSD_RAID, and XORs all of the respective LBA_1 values from SSD_2, SSD_3, and SSD_RAID together. This recreates LBA_1 (SSD1), and the recovery is completed.

However, in a case where two read uncorrectables are returned, it is a bit more complex. For example, initially, LBA_1 is read from SSD_1, and a read uncorrectable returned. Then LBA_1 is read from each of SSD_2, SSD_3, and SSD_RAID, as noted above, in an attempt to reconstruct LBA_1 (SSD1), but now a read uncorrectable is also returned for one of the three other SSDs. For example, for illustrative purposes, say LBA_1(SSD2) from drive SSD_2 is the additional read uncorrectable. While, normally, this situation is a failure to recover data within this enclosure, and the host 380 then reports a loss of data, in one or more embodiments, this double read uncorrectable may be remedied as described below.

Figure 4:
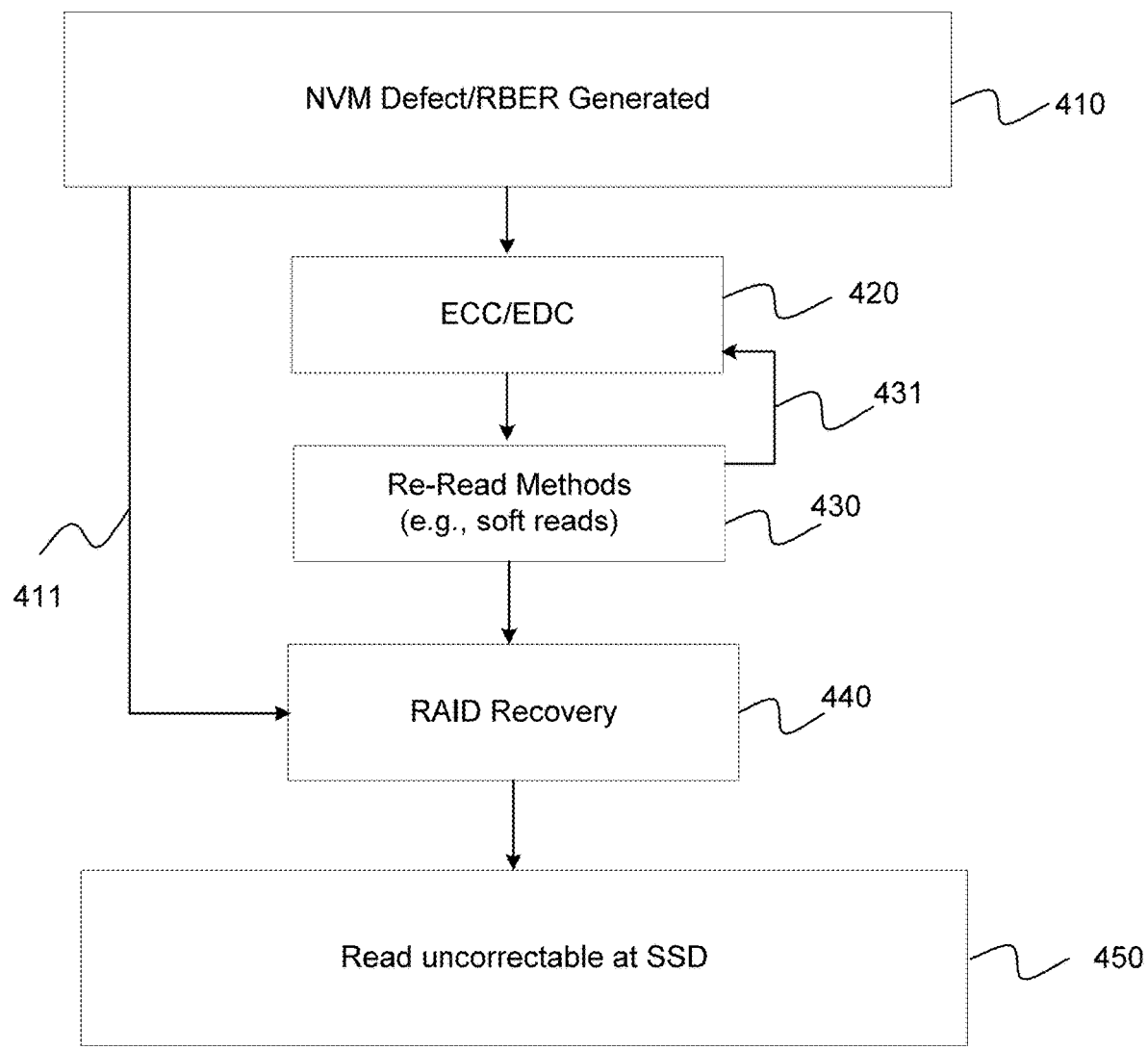
FIG. 4 illustrates a process flow diagram of a method 400 of data integrity for use within an SSD at an example data center such as is shown in FIG. 3, in accordance with various embodiments.

Prior to describing FIGS. 5A through 7, in order to appreciate the context of various embodiments according to the present disclosure, FIG. 4 illustrates an example conventional process 400 for ameliorating bit errors in an example SSD. Thus, the conventional process of FIG. 4 is useful background for the example methods illustrated in FIGS. 5A, 5B, 6 and 7, each described below. Conventional process 400 would be performed, for example, by enclosure processors 361, or enclosure 370-2, of FIG. 3A.

With reference to FIG. 4, at block 410 a non-volatile memory (NVM) defect and an associated raw error bit rate (RBER) are generated in a codeword of a storage device, for example a SSD. In order to correct these errors, at block 420, an internal ECC/EDC engine of the SSD may be used. If that effort fails, then the example process proceeds to block 430, where re-read methods, such as, for example, soft reads, may be performed. It is here noted that a soft read is one where the voltage threshold of the NVM cell, e.g., a NAND cell, is moved up and down, to capture data bits of the codeword that were very close to the threshold, but originally misread. For example, the voltage level of a given cell may slip up or slip down at the time of, or following, programming, and a soft read may detect and identify any bits for which this has occurred. With the identification of these bits, and correction to their actual (or assumed to be actual, based on the soft read) respective values, a retry of the ECC/EDC correction of block 420, now with the corrected bits as a result of the soft re-read, may result in a successful correction of the codeword at a repeated block 420. This is illustrated by path 431 in FIG. 4. In one or more embodiments, the bits that are identified by such soft reads as close to flipping value may be tracked. The bits that are tracked as marginal may accelerate later speculative recovery stages executed by the host. Thus, the host may first speculate using data from the other drive rather than the marginal bits.

Additionally, in one or more embodiments, an SSD may check for bit erasures or stuck bits. This involves trying to program everything to 0's and read if there are any 1's, and then program everything to 1's and read if there are any 0's. This process can identify single failed cells out of the larger (e.g., 4 KB) sectors, and such erased or stuck bits flipped. As was the case with a soft read, this additional knowledge may also then be used to retry the ECC/EDC processing at block 420, by following path 431. Tracking the erasure identified stuck bits will be helpful for the host to emphasize speculative data exchanges using the other drive's data rather than the stuck bits.

By way of example, the read recovery flow of FIG. 5C, described below, may be re-used on the write_raw data. However, in one or more embodiments, due to the data being in a buffer rather than on the NVM, re-read methods such as soft-reads or erasure checks may be skipped.

It is noted that these steps of soft-reads and erasure checks extract additional information that may be stored and used to assist in later recoveries. Soft reads will identify bits that are slightly over the threshold of values. As noted, these may be described as marginal bits.

Continuing with reference to FIG. 4, if the re-read methods at block 430 fail to correct the errors, with any retries as described above, the example process may proceed to block 440, where recovery using a RAID of the current SSD is attempted. FIG. 4 also shows, via path 411, that the tasks at each of blocks 420 and 430 may be omitted, and the NVM defects may directly be addressed by the RAID recovery of block 440.

If, however, the RAID recovery (or alternatively, recovery under other protection schemas) at block 440 fails, which is equivalent to the RAID recovery within a single SSD of a single enclosure, e.g., any of SSDs E2-01 through E2-24 of FIG. 3A, in addition to a failure at each of blocks 420 and 430, including any repeat of block 420 following re-read methods as is illustrated by path 431, then, in order to correct the errors, it is at this point that a host receives a read uncorrectable indication in response to its read command. It is at this point that embodiments according to the present disclosure may be implemented, where one or more resources outside of an SSD, or outside of an enclosure in which an example SSD is provided, such as, for example, by accessing data in several racks/systems/enclosures all protected under a single EC umbrella, such as, for example, the racks/systems/enclosures illustrated at level 370 of FIG. 3A, to correct the bit errors.

Accordingly, FIG. 5A illustrates a process flow diagram of a method 500 for identifying and correcting errant bits of a codeword stored in a storage device, e.g., a NAND based device, in accordance with various embodiments. With reference thereto, method 500 is shown as including blocks 510 through 560. In alternate embodiments, method 500 may be implemented in more or less blocks.

Beginning at block 510, while reading data distributed across a plurality of SSDs spanning one or more data center(s), a host receives a report of a read uncorrectable event from a storage device. (It is here noted that the term "read uncorrectable" is technically NVMe terminology. However, as used in this disclosure, the term is meant in a more general sense, and is therefore understood to include equivalent unreadable data events on any storage device.) For example, the host may have been reading data from several LBAs across various SSDs in a data center, such as, for example, SSDs E2-01 through E2-24 of local data center 340 of FIG. 3A, as described above. The host may have issued a read command for data that was stored in a given LBA on a first SSD. In response, the first SSD may have gone through all of the various tasks shown in FIG. 4, all of which failed, and thus is at the point where a read uncorrectable indication has been sent to the host regarding the requested data.

It is here reiterated that, as noted above with reference to FIG. 3A, the "host" referred to in method 500 may be a single processor or processor groups, or may be several processors in different hardware, acting in concert. Thus, for example, with reference to FIG. 3A, method 500 may be implemented in processing tier processors 311, network switch 371, enclosure processors 361, or in any combination of them, acting in concert.

From block 510, method 500 proceeds to block 520, where the host issues a read_raw command, in accordance with various embodiments. It is here noted that the read_raw and write_raw commands as used in this disclosure are synonyms for the terms read_long and write_long as used in the Provisional. However, in order to use nomenclature that would not be possibly confused with the known serial attached SCSI (SAS) commands known as "read_long" and "write_long", in the present disclosure the terms "read_raw" and "write_raw" are used for the new commands herein introduced to describe various embodiments of the present disclosure. The read_raw command of FIG. 5 seeks to obtain data and ECC/EDC metadata, from a second storage device, of the LBA(s) causing the uncorrectable error at the first storage device.

Within an enclosure (e.g., enclosure 370-2 of FIG. 3A), a host tracks the data it expects to be stored at specific LBAs. As described above, if data is lost at one particular drive's LBA (and thus the host receives a read uncorrectable), the host then knows how to reconstruct the data. Therefore when the host reads a particular LBA, it falls back into the enclosure level data protection scheme such as EC, RAID, mirroring or other strategy.

To be more specific, by way of example, if a host enclosure is implementing a mirroring strategy for data protection, the host will first try to read the data from, say, SSD_1 at location LBA_mirror_1. If the SSD_1 returns read uncorrectable for LBA_mirror_1, then the host will read the data from the mirror location SSD_2 location LBA_mirror_2.

By way of further example, when the host enclosure is implementing an XOR RAID strategy for data protection, the following recovery flow may occur. The host first receives a read uncorrectable at SSD_1 at location LBA_original. The host will react by reading the corresponding LBAs from the other SSDs that are in the same XOR RAID stripe (e.g., with reference to FIG. 3A, SSD E2-02 through SSD E2-24). The host will then XOR all of the contributing LBAs together to arrive at a reconstructed value for the missing data.

From block 520, method 500 proceeds to block 530, where the host obtains the same LBA (or LBAs) from one or more other SSDs of the plurality of SSDs. Using this data it is possible to try and reconstruct the erroneous bits of the codeword that triggered the read uncorrectable event. As noted above, the data and metadata from the other SSDs is relevant to such a reconstruction inasmuch as the plurality of SSDs are all part of an erasure coding/replicated data scheme. In embodiments, at block 530, any additional data relevant to error correction may also be obtained through the usage of a read_raw command. This may include, for example, characterizations of the error modes of the NAND of the errant SSD, characterization of error modes for the specific customer whose data the errant bits are, the generation of the NAND and its settings, and the same information for the NANDs of the other SSDs of the plurality of SSDs. Use of such error characterization data is described in greater detail below.

From block 530, method 500 proceeds to query block 540, where it is determined whether there are sections of mismatching bits between the read_raw data that can be used to speculatively correct the errant bits of the read uncorrectable. If "Yes" at query block 540, then method 500 proceeds to block 545, described below. If, however the response is "No" at query block 540, then method 500 returns to block 530, where the host obtains the data and metadata for the LBA from still other SSDs of the plurality of SSDs. In embodiments, this may require going outside the current enclosure, as described below. In embodiments, this loop through blocks 530 and 540 continues until the response at query block 540 is "Yes."

It is noted that FIG. 5C, described below, provides details of an exemplary process that may be used to implement blocks 530 and 545, in accordance with various embodiments.

At block 545 the host, now having available sufficient data and metadata to correct the errant bits, corrects those errant bits, or at least does so with a high confidence, e.g., a high probability. In embodiments, there are several possible techniques that may be used, singly or in combination, to perform the reconstruction or correction of the errant bits. These are descried below.

From block 545, method 500 proceeds to block 550, where the host issues a write_raw command, in accordance with various embodiments. The write_raw command of FIG. 5A seeks to rewrite the reconstructed/corrected data and metadata to appropriate LBAs of the errant SSD where it was in error.

From block 550, method 500 proceeds to block 555, where the host reads back the relevant data from the SSD just written to in block 550, to confirm that it is now correct. Finally, from block 555, method 500 proceeds to block 560, where the host, using a write_raw_extended command, rewrites the now corrected data to other SSDs of the plurality of SSDs Returning now to block 545, some example techniques that the host may use, in embodiments, to reconstruct the errant bits are next described, with reference to FIG. 5C. It is noted that embodiments according to the present disclosure are not platform dependent. The disclosed techniques may be implemented using NVMe, SATA or SAS, for example. In embodiments, the newly created read_raw and write_raw commands utilize the ECC engines of a SSD to pull out data from all mirrored drives. This feature allows the host, for example, to create a set of hypothetical reconstructions of the errant bits. The set may then, in embodiments, be fed into the ECC engines of the SSD, to reconstruct, from the set of hypothetical reconstructions of the errant bits.

It is also noted that in embodiments according to the present disclosure, the new read_raw and write_raw commands may be included in, for example, the NVMe, Open Channel, or related specifications going forward.

In embodiments, reconstructing errant bits may involve using whatever additional knowledge that can be mustered to produce a set of hypothetical reconstructions of the errant bits. These hypothetical reconstructions may then be fed through the ECC engines of an SSD. Various options are next described.

Further, in embodiments, the error modes of a NAND may be characterized as an aid in what errors or types of errors to expect. For example, NAND error modes change with both generation of NAND, as well as the "trim" of the NAND, which is a term used to mean the control settings of the NAND. Some common trim changes include, for example, a number of program segments in a single program, a time of each program segment, voltage settings of each program segment, time to pause to allow transients in the sense circuitry to settle before recording the read sense data, time to average the read sense current value, and analog circuitry ramp, step, filter, and other settings.

Thus, in embodiments, taking both the NAND's mode and settings, the NAND's failure modes may be characterized to better understand how the NAND is accumulating bit errors. In embodiments, such characterizations may be used in the correction performed at block 545 of method 500 in FIG. 5A. Such characterizations would be different for different modes that the NAND may operate in, such as programs, reads and erases. If a NAND is heavily involved in read operations, then, in one embodiment, that knowledge may be used to make a best guess as to what the errors are, and how to correct them with the available data obtained from the other hosts.

For example, the NAND of the errant SSD may be programmed frequently. As a result, one may suspect the programming modes of failure as having created the errant bits. It is also useful, to correct the errant bits, to know if the data programmed to the SSD was dispersed in locality, or whether, for example, mostly in sequential large command writes to the SSD. Thus, in embodiments, data center knowledge of the NAND may be used to make a best guess as to the type of error that flipped the errant bits, and thus, how to best correct it. In embodiments, such data center level knowledge may be acquired through various means, such as, for example, complete direct logging of activity to SSDs, filtered or simplified logging of activity to SSDs, heuristic tracking, or simply data center infrastructure and architectural inference. That is, that the data center uses some enclosures fully populated with SSDs intended at cold data storage for long term reliability in comparison to an active enclosure that is filling a role more similar to a cache in the data center system architecture. An SSD in either of these two extreme positions of usage doesn't need to be monitored for what activity went to it. It is thus possible to make a first order guess on the activity going to the drive based on it being in the caching or the cold storage tier.

Or, for example, on perhaps the other end of the knowledge spectrum, a voting scheme may be applied to the data obtained at block 530 and any related data. Thus, in embodiments, if the data obtained from the other hosts includes three copies of the block in question (i.e., the block in which the errant bits occurred on the errant host), and two of them look the same, while the third does not, the two may be followed, under the theory that it is unlikely that both of them accumulated the exact same bit error at the same time. Thus, characterization of the NAND involves the most additional knowledge, a voting scheme involves the least additional knowledge, and relies on the probabilities of multiple hosts in accumulating similar errors. Alternatively, in other embodiments, other approaches may be used, such as, for example, AI tracking, or, for example, weighted voting.

In another embodiment, a new vendor specific command may be used, where, based on characterization of that vendor's NAND, one takes each read that failed, and performs a soft read above and below the standard sense voltage thresholds. The soft reads may sense bits close to the existing standard sense voltage to identify one or more bits that are likely to be the accumulated errors. The theory being that the bits drift from one location to another and they most likely did not drift too far out from their initially targeted programmed state. Thus, an aggregate set of knowledge may be brought to bear in the correction of errant bits at block 545, such as, for example, where, in a 3-way mirroring system, three mirrors that failed each have a vote, and the soft read information from each codeword of the mirror is also taken into consideration.

As another example, customer specific error profiles may also be employed, which may be different for various data center customers using the same set of SSDs. Further, where the NANDs used in a data center, and thus the ECCs they apply, are not homogenous across the entire data center, then, in embodiments, ECC data may not be used, but customer data (e.g., what type of operations that customer used) may be more significant.

Figure 5B:
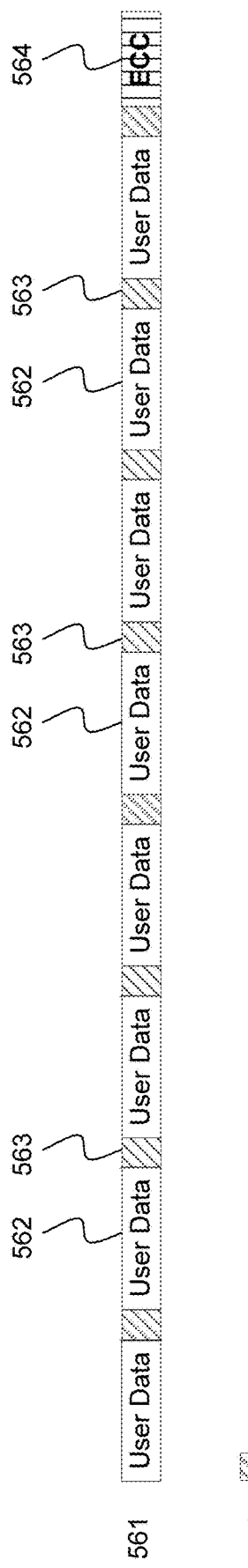
FIG. 5B depicts the user data, metadata and ECC data in an example codeword, to illustrate which of those data types may receive speculative corrections, in accordance with various embodiments.

Next described are details of blocks 520, 530 and 545 of FIG. 5A. However, to motivate that description, FIG. 5B is first discussed, which depicts user data, metadata and ECC data in an example codeword, to illustrate which of those data types may receive speculative corrections, in accordance with various embodiments. With reference to FIG. 5B, there is shown example codeword 561. Codeword 561 is similar to the example codeword depicted in FIG. 2C, and described above. Codeword 561 includes eight blocks of user data 562, as shown. Each block of user data is followed by a host LBA or drive specific metadata 563, as also shown. Following the eight sets of {user data+metadata}, there is a terminating ECC block 564.

Continuing with reference to FIG. 5B, it is noted that, in some embodiments, it is only the user data that should receive the speculative corrections as described above with reference to FIG. 5A. In such embodiments, metadata 563 may be omitted from examination. In such embodiments, it is possible that the ECC data 564 may be examined, if the same HLBAs are used from drive to drive. However, if there are different HLBAs, or, for example, if there are drive specific metadata differences that cannot be connected, then the ECC data 564 should be skipped as well. Given the illustrative codeword of FIG. 5B, FIG. 5C is next described. By way of example, the description for FIG. 3B used the same LBA_1 on each of the contributing SSDs to align HLBA metadata of the codewords.

Figure 5C:
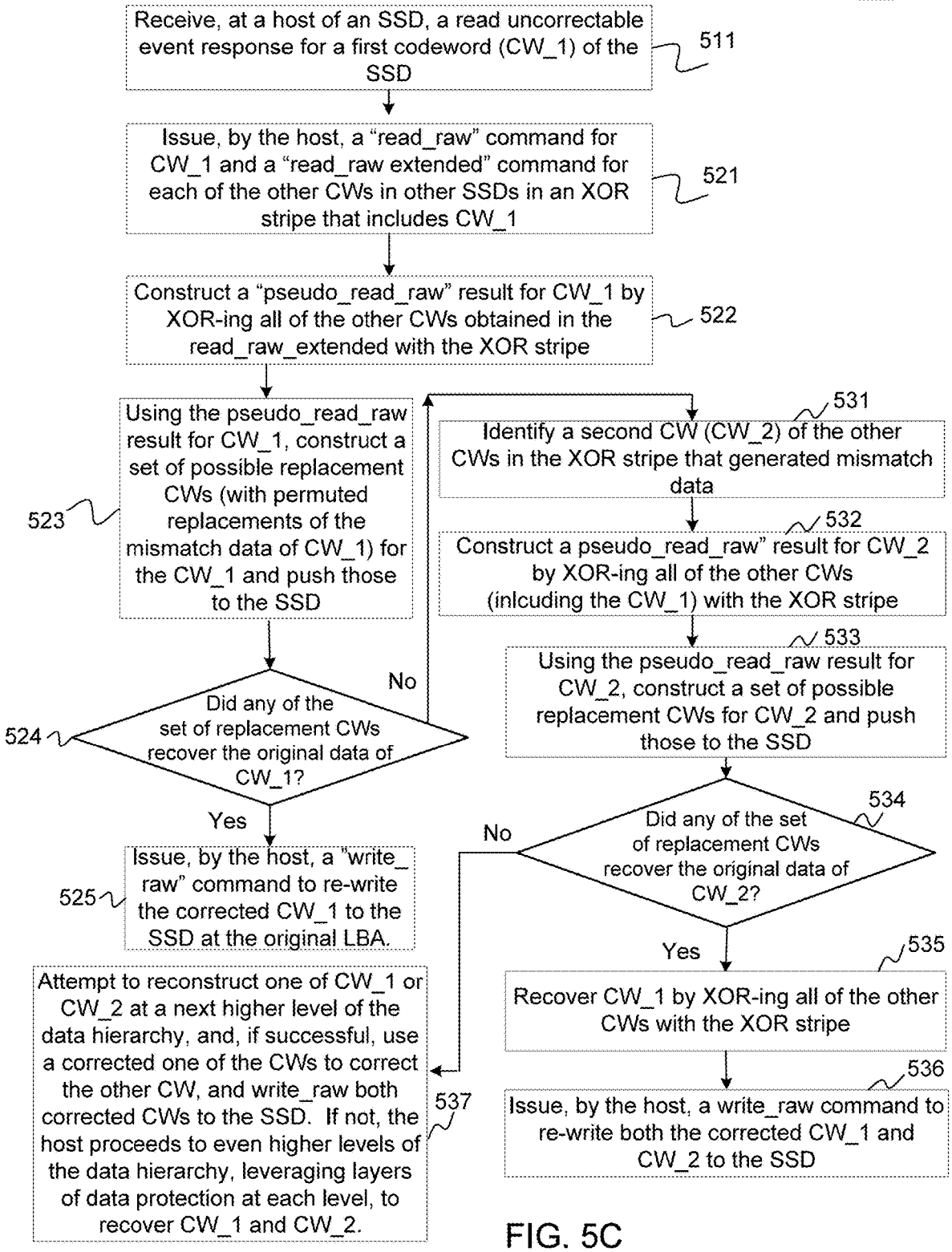
FIG. 5C provides additional detail of blocks 540 and 545 of method 500 of FIG. 5A, in accordance with various embodiments.

FIG. 5C illustrates a process flow diagram of a method 501 for implementing blocks 520, 530 and 545 of FIG. 5A, in accordance with various embodiments. The process illustrated in FIG. 5C illustrates how a faulty codeword of an SSD may be recovered by various speculative reconstructions of the faulty codeword using analogous data (e.g., data at the same LBA(s)) in other SSDs.

With reference to FIG. 5C, method 501 is shown as including blocks 511 through 536. In alternate embodiments, method 501 may be implemented in more or less blocks.

Beginning at block 511, a host of an SSD, after attempting to read a first codeword of data from the SSD, receives a report of a read uncorrectable event from the SSD. The SSD may be any one of SSDs E2-01 through E2-24 of FIG. 3A, for example, or, for example, SSDs 381 of FIG. 3B. For ease of illustration, it is assumed that the "read uncorrectable" was returned to the host from SSD E2-01, but this is arbitrary. Thus, the host may have issued a read command for data that was stored on SSD E2-01, and in response, the SSD E2-01 may have gone through all of the various tasks shown in FIG. 4, all of which failed. It is at this point that a read uncorrectable indication has been sent to the host regarding the requested data. In some embodiments, as reflected at block 440 of FIG. 4, the SSD and a set of other SSDs may all be protected by a RAID, for example RAID 362. The RAID may, for example, protect all of the SSDs in its group by an XOR stripe.

For ease of illustration, in the description of FIG. 5C, it is also assumed that the SSD is internally protected by an XOR stripe, such as is illustrated in FIG. 2B, described in detail above. Thus, it is assumed that when the host received the "read uncorrectable at SSD" response at block 511, the SSD has already tried to recover the codeword at the internal SSD level, as described in FIG. 4, including by XOR-ing the XOR stripe for the codeword stored in die 232 of FIG. 2B with the analogous codeword from each of dies 202 through 231, and the data could not recover. For example, the codeword could be that illustrated by the black box shown in the top left of each of the planes of each of the dies of the single SSD shown in FIG. 2B. This means that a read of the codeword at the same LBA of least one additional die of the SSD also failed.

It is here reiterated that, as noted above with reference to FIG. 3A, the "host" referred to in method 501 may be a single processor or group of processors, or may be several processors in different hardware, acting in concert. Thus, for example, with reference to FIG. 3A, method 500 may be implemented in processing tier processors 311, network switch 371, enclosure processors 361, or in any combination of them, acting in concert, and, for clarity, the term "host" as used herein, may refer to any of these processors or switches, in accordance with various embodiments.

From block 511, method 501 proceeds to block 521, where the host issues a read_raw command for the first codeword, and a read_raw_extended command for each of the analogous codewords that are part of the same XOR protective stripe that includes the first codeword. As noted above, the read_raw command sent by a host seeks to obtain data and ECC/EDC metadata of a codeword, even if the read was uncorrectable. The read_raw command just obtains whatever bits are there. In addition, a read_raw_extended command seeks the data and ECC/EDC metadata of all of the other codewords at the same LBA(s) that are in a common data protection scheme (e.g., a RAID, an XOR, or even an erasure coding scheme) with the first codeword.

From block 521, method 501 proceeds to block 522, where the host constructs, using the respective codewords from all of the SSDs, a pseudo_read_raw result for the first codeword. What is meant by a "pseudo_read_raw" result is as follows. Given that the host has the codeword from the same LBA at each of the SSDs, it tries to construct possible alternate versions of CW_1 that may actually recover. In one embodiment, each possible alternate version of CW_1 flips bits of CW_1 as received using the read_raw command of block 521. Thus, for example, it may be assumed that the failed read codeword was in a given LBA of SSD E2-01 of FIG. 3A. The host now has, due to the read_raw of that LBA of SSD E2-01, and due to the read_raw_extended commands sent to SSDs E2-02 through E2-24, not only the failed codeword of SSD E2-01, but also all of the other codewords in the same LBA, from each of SSDs E2-02 through E2-24 of FIG. 3A. This data is valuable, because, as shown in FIG. 3A, all of SSDs E2-01 through E2-24 are protected by the same RAID 362, which is, in this example, is assumed to be an XOR protection scheme, where the XOR stripe is stored in the last SSD, SSD E2-24 in FIG. 3A.

In embodiments, the host uses all the data it now has in its possession as follows. For ease of illustration, it is assumed that the codeword is stored at LBA_1 of SSD E2-01, and the read_raw of that first codeword, returned the result read_raw_1, as follows:
Read_raw_1=GGGGGGGXXGGGXGGGMMMMM,
where G="good" or matching data, X=mismatch data supplied from the SSD E2-01, and M=the ECC/EDC portion from SSD E2-01.

In embodiments, the host XORs all of the other LBA_1 codewords, which have been obtained using the read_raw_extended command sent to each of SSDs E2-02 through E2-24, with the XOR stripe from SSD E2-24, to obtain the first codeword, from LBA_1 at SSD E2-01, the very one that returned a failed read. The output of this process is a "pseudo_read_raw" result for the first codeword, which may have the form:
Pseudo_read_raw_1=GGGGGGGGYYGGGYGGG,
where only user data, and not the ECC/EDC portion, is obtained. The Y bits in the pseudo_read_raw result refer to mismatch data in the pseudo codeword. The reason pseudo_read_raw_1 does not recover itself, is due to accumulated errors in the XOR result, which means that, in addition to CW_1, another codeword at the same LBA, in one of the other SSDs of SSD E2-02 through E2-24, is a read uncorrectable.

From block 522, method 501 proceeds to block 523, where, in embodiments, the host uses the differences between the two results for the first codeword, (CW_1), as shown below, to construct several possible revisions of CW_1, one of which is hopefully correct. Thus, using the two codewords (aligned so that the mismatch bits line up) CW_1 and pesudo_CW_1 form the XOR reconstruction:
Read_raw_1=GGGGGGGXXGGGXGGGMMMMM, and
Pseudo_read_raw_1=GGGGGGGGYYGGGYGGG,
it is seen that there are three mismatch bits in each version of CW_1 (these are underlined). In embodiments, the host switches the X mismatch bits of read_raw_1 with the Y mismatch bits of pseudo_read_raw_1 in all possible permutations, to generate a set whose elements are the following seven constructs for CW_1, which is stored at LBA_1 of SSD E2-01 of FIG. 3A:
(One Mismatch Bit Swapped Out):
Replacement1_CW_1:   GGGGGGGGYXGGGXGGGMMMMM
Replacement2_CW_1:   GGGGGGGGXYGGGXGGGMMMMM
Replacement3_CW_1:   GGGGGGGGXXGGGYGGGMMMMM
(Two Mismatch Bits Swapped Out):
Replacement4_CW_1:   GGGGGGGGYYGGGXGGGMMMMM
Replacement5_CW_1:   GGGGGGGGYXGGGYGGGMMMMM
Replacement6_CW_1:   GGGGGGGGXYGGGYGGGMMMMM
(All Three Mismatch Bits Swapped Out):
Replacement7_CW_1:   GGGGGGGGYYGGGYGGGMMMMM.

It is here noted that Replacement7_CW_1 is the same as Pseudo_read_raw_1, with all of the mismatch bits of read_raw_1 now replaced. It is further noted with reference to block 523 of method 501 that it may not be necessary to speculatively try each of the permutations of the replacement codewords, if a correction first occurs by trying only a subset of them.

Thus, in embodiments, certain optimizations and intelligently crafted speculative corrections, most likely to recover the original codeword may be attempted first. Thus, in embodiments, it is the original read_raw (of LBA_1 of SSD E2-01), although incorrect, that is the most likely to have a small correction distance from the recoverable codeword. So, in embodiments, one may start with the original read_raw and do one section swap outs of that original read_raw result first, prior to advancing to double section swap outs. Thus, in the example above, Replacement1_CW_1, Replacement2_CW_1, and Replacement3_CW_1 would be tried first. Additionally, if bits have been identified via the soft reads that are close to bit-flipping, then those swap outs may also be tried at a higher priority. It is noted that erasure bits are bits that are stuck in one position. If the SSD identifies erasure bits, then the pseudo_read_raw values may be used at a higher priority. In such embodiments, the erasure combinations may be moved all the way to the bottom of the speculative priorities. Finally, this example illustrates only one grouping of ECC and drive metadata without differentiation between the two components. The descriptions of FIGS. 2C and 5B above illustrate other potential scenarios with more differentiated possibilities dependent on implementation.

In embodiments, by prioritizing these attempts at speculative correction, the expected number of speculations actually needed to be tried before a successful recovery occurs may be minimized, which provides a time/implementation optimization. In embodiments, it is possible to return success with the first speculative codeword recovered. In other embodiments, it is possible to try more, and even possibly all, of the speculative codewords in order to reduce the probability of a miscorrection on the final corrected codeword.

Referring back for a moment to FIG. 2C, it is noted that the greater the portion of two codewords that are similar, the more bits there are in the two respective codewords that can be compared for errors. Thus, if the PI is generated in the same manner for the two codewords, then the PI segments labeled 261 can be compared between the read_raw values of the two read uncorrectable codewords. Further, if the host selected the same LBA on two different SSDs, then the HLBA value 262 can be compared between the two read uncorrectable. Similarly, subECC 263, EDC, and ECC 265 can also be compared if the same ECC algorithms were implemented for the two read uncorrectable codewords from the 2 SSDs.

Thus, both media and controller implemented decisions are most likely to align by using the same SSD vendor and SSD generation by aligning controller decisions (e.g., codeword data type location, ECC encoding scheme, scrambling, data randomization, and other controller implemented decisions will align by using the same SSD) and media behaviors (HDD head reader/writer attributes, channel optimizations, NAND generation and NAND manufacturer will align bits in error failure behavior such as soft read characterization and media defect behavior direction).

By performing the optimizations above and including drive specific metadata, PI, HLBA, ECC and extended portions in the codeword, it is now feasible to compare user data regions as well as the extended metadata regions. This extended comparison allows the speculative codewords to now include exchanges in the metadata regions.

Continuing with reference to FIG. 5C, at block 523, after constructing the set of ReplacementX_CW_1s, the host then pushes each of them to the SSD, e.g., SSD E2-01, to see if any of them recover the original data of CW_1. Next, from block 523, method 501 proceeds to query block 524, where it is determined whether any of the set of replacement CW_1s has recovered the original data of CW_1. If "Yes" at query block 524, then method 501 proceeds to block 525, where the host issues a write_raw command to re-write the corrected CW_1 to the SSD E2-01, in particular to its LBA, LBA_1. Method 501 then terminates at block 525.

If, however the response is "No" at query block 524, and thus none of the replacements for CW_1 recover, then, in embodiments, a second option may be pursued. Because, as noted above, if the pseudo_read_raw XOR based reconstruction for CW_1 did not recover, it is because at least one additional codeword in the XOR stripe failed to read. Using that information, this second option is to try to identify which other codeword that is (assuming there is only one additional read failure codeword, which is most likely), and attempt to reconstruct it. If it can be reconstructed, then it can be used, with, for example, the original XOR stripe from RAID 362 to regenerate the original CW_1. Thus, when the response at query block 524 is a "No", method 501 proceeds to block 531, where the host identifies a second codeword, CW_2, of the other codewords in the XOR stripe that generated mismatch data. For example, CW_2 may be the codeword at LBA_1 in SSD E2-02. In embodiments, this may be done by pushing each of the codewords into the SSD and seeing which one does not recover.

Continuing with reference to FIG. 5C, from block 531, method 501 proceeds to blocks 532 and 533, in that order. These blocks are identical to blocks 522 and 523, described above, except that now the set of replacement codewords are for CW_2, the codeword from SSD E2-02 at LBA_1, and this new set of replacement codewords may be called ReplacementX_CW_2, where X is an integer that reflects the number of permutations between read_raw_2 (already obtained at block 521) and pseudo_read_raw_2 (obtained at block 532).

Thus, continuing with reference to FIG. 5B, from block 533, method 501 proceeds to query block 534, where it is determined whether any of the set of replacement CW_2s recovered the original data of CW_2. If "Yes" at query block 534, then method 501 proceeds to block 535, where, in embodiments, using the now recovered CW_2, the host recovers CW_1 by XOR-ing all of the CWs, including the now recovered CW_2, with the original XOR stripe from die 232.

Finally, from block 535, method 501 proceeds to block 536 where the host issues a write_raw command to re-write the corrected CW_1 and CW_2 to the SSD. Method 501 then terminates at block 536.

If, however the response is "No" at query block 534, and thus no possible replacement CW_2 recovers, then data recovery within the set of related SSDs has failed. However, in embodiments, a different option may be pursued. This is next described.

If the response is "No" at query block 534, then method 501 proceeds to block 537, where the host attempts to reconstruct one of CW_1 or CW_2 at a next higher level of the data hierarchy, and, if successful, uses a corrected one of the two CWs to correct the other CW, and write_raw both corrected CWs to the original SSD, say SSD E2-01. For example, with reference again to the example of FIG. 3A, in the discussion thus far, corrections at SSD E2-01 have been attempted only by using data within Enclosure 370-02. However, SSD E2-01, which is part of Enclosure 370-2, is also part of several higher levels of data protection. In embodiments, the host may, for example, proceed to these higher layers, such as, for example, trying an SSD in another enclosure of the enclosures 370-1 through 370-16. These are mutually protected by a RAID 362. Thus, even if CW_1 and CW_2 of SSD E2-01 cannot be recovered, one of them may be recoverable by using the RAID 362. Once of the two failed read codewords is recovered, it can be used, as shown at block 535 of FIG. 5B, to recover the other one.

Thus, in embodiments, at block 537, method 501 attempts to reconstruct one of CW_1 or CW_2 at a next higher level of the data hierarchy (shown in FIG. 3A), and, if successful, uses a corrected one of the CWs to correct the other CW, and write_raw both corrected CWs to the original SSD. If not, the host proceeds to even higher levels of the data reliability hierarchy of the data center, leveraging layers of data protection at each level, to recover CW_1 and CW_2. These data protection schemes may include, for example, erasure coding as well as mirroring. The example of RAID recovery by way of XOR is sufficient to apply to both mirroring and EC, as mirroring is a simplified derivative of a multi-drive XOR, and RAID by way of XOR is one simplified derivative implementation of the more extensive possibilities EC implementations could entail. Eventually, as shown at 320 of FIG. 3, a mirrored data center is available that should have the exact same data as the failed codeword CW_1, and can always be used to recover it, albeit at a cost of network congestion, speculative codeword retries, and latency. Method 501 thus terminates at block 537.

To visually illustrate method 501 of FIG. 5C, using the example configuration of FIG. 3B, described above, FIG. 5D provides a visualization of an example read_raw result for an LBA_1 (SSD1) of a first drive SSD_1, a cumulative XOR of the corresponding LBA_1s of three remaining drives LBA_1 (SSD RAID), and example speculative replacements of the LBA_1 (SSD1) based on the differences between LBA_1 (SSD1) and LBA_1 (SSD RAID), in accordance with various embodiments.

Figure 5D:
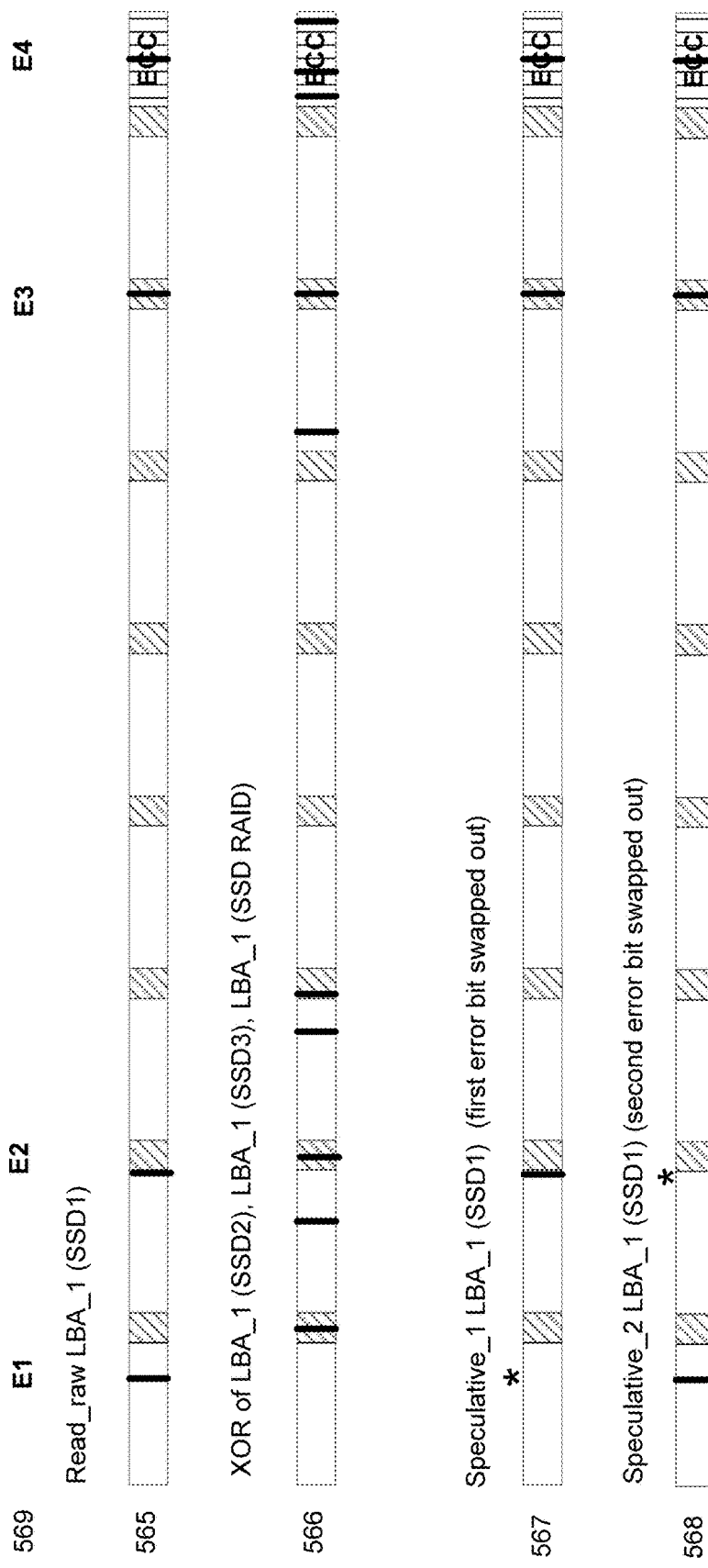
FIG. 5D illustrates a visualization of an example read_raw result for an LBA_1 (SSD1) of a first drive SSD_1, a cumulative XOR of the corresponding LBA_1s of three remaining drives LBA_1 (SSD RAID), and example speculative replacements of the LBA_1 (SSD1) based on the differences between LBA_1 (SSD1) and LBA_1 (SSD RAID), in accordance with various embodiments.

With reference to FIG. 5D, 565 is a read_raw result of LBA_1 (SSD1), the codeword stored at LBA_1 on a first SSD of FIG. 3B, namely SSD1. This codeword returned a read uncorrectable to its host, as noted above. To reconstruct LBA_1 (SSD1), the host XORs LBA_1 from each of the remaining SSDs, in this case, LBA_1(SSD2), LBA_1 (SSD3) and LBA_1 (SSD RAID), as described above with reference to FIG. 3B, to generate pseudo LBA_1 (SSD1) 566. Pseudo_LBA_1 (SSD1) also does not recover. Thus, the host follows the procedure of block 523 of method 501, a few examples of which are here visualized.

As shown in FIG. 5D, an erroneous bit of a codeword is indicated by a solid vertical line. Thus, at 569 there are shown four error positions E1, E2, E3 and E4, at which respective positions there are four erroneous bits in the raw read result for codeword LBA_1(SSD1) 565. By comparison with the cumulative XOR result 566, the only position where error bits overlap for these two codewords is at position E3. Thus, for the other error positions for codeword 565, in one embodiment, several speculative versions of LBA_1 (SSD1) may be constructed. Two of these, each using only a single bit swap out of erroneous bits in user data fields, are illustrated in FIG. 5D.

Thus, Speculative_1 LBA_1 (SSD1) is created by swapping out the first error bit, at bit position E1 (first error bit swapped out), and an asterisk is provided just above where this bit is swapped out. Similarly Speculative_2 LBA_1 (SSD1) is created by swapping out the second error bit, at bit position E2 (second error bit swapped out), and an asterisk is provided just above where this bit is swapped out. Other Speculative_N LBA_1 versions may similarly be constructed, with a two bit swap out, or, in embodiments where there is sufficient similarity among the four SSDs of this example, by also swapping out the error bits of 565 that are in a metadata field or an ECC field, as described above. Including the error bits of 565 that fall in metadata or ECC fields increases the number of possible permutations of the Speculative_N LBA_1 (SSD1) codewords, and also increases the chances that a speculative codeword will recover.

Figure 6:
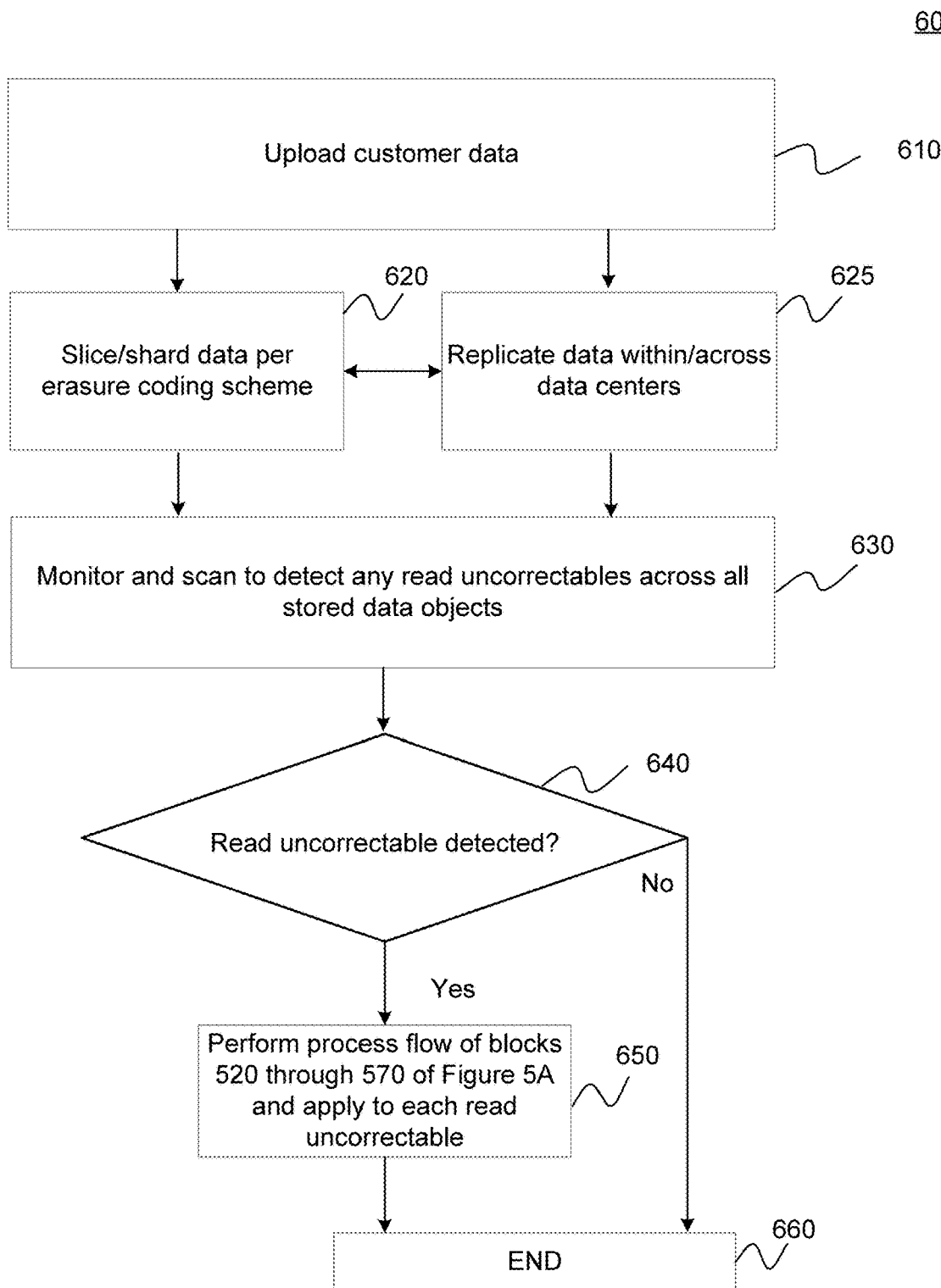
FIG. 6 illustrates a process flow diagram of a method 600 which is a superset of method 500 of FIG. 5A, in accordance with various embodiments.
Figure 7:
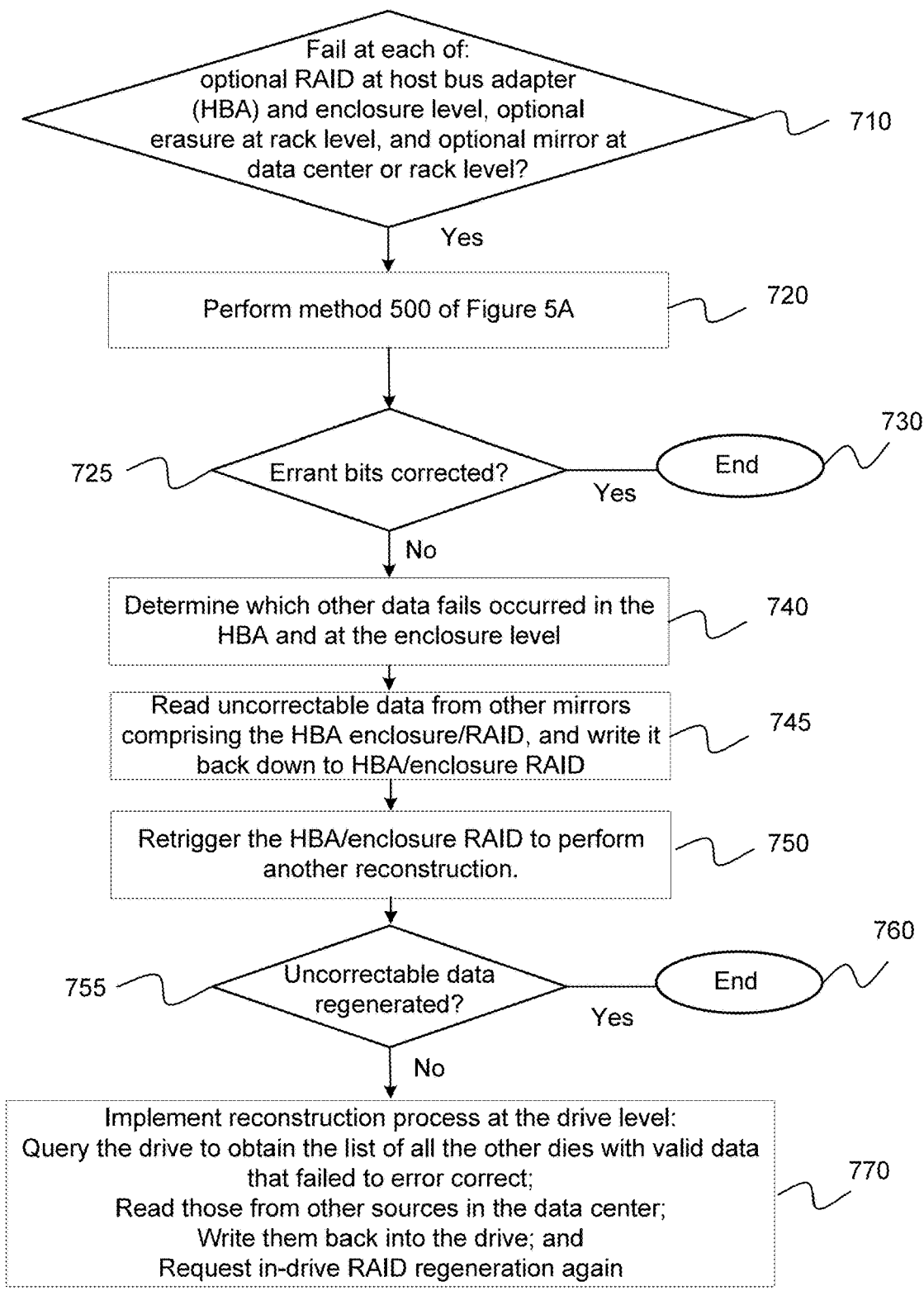
FIG. 7 illustrates a process flow diagram of a method 700 for use when method 500A of FIG. 5A (and method 501 of FIG. 5B) do not result in a correction of errant bits, in accordance with various embodiments.

It is also noted that FIGS. 6 and 7, next described, illustrate precisely such a going up the data hierarchy to recover the failed read data.

FIG. 3A shows an embodiment of data center data reliability with implementations of EC, RAID, or mirror across systems of drives (in embodiments, enclosures or racks). Row 370 can be a data mirror of 370-1 and 370-2. In the embodiment of a mirror, there is a possibility of a read uncorrectable from both mirrors (370-1 and 370-2).

As described above, in one or more embodiments, a read_raw to both 370-1 and 370-2 would be executed in order to get the originating failed read uncorrectable data from the originating failing SSDs. These two read uncorrectables would be expected to have different bits in error accumulated under different SSD conditions. Therefore, when comparing read_raw from 370-1 and 370-2, it is reasonable to expect uncorrelated error conditions in both codewords returned at this data center level.

New speculative codewords can then be created based off of the two read_raws received at this data center level. Once speculative codewords are generated, they may be tried as described above, with reference to FIG. 5C.

Within the data center view, read_raw_extended will now have an expanded definition. Read_raw_extended may return the original failing codeword, original failing SSD_RAID, and peer SSD_RAID data within the enclosure (aligning to earlier example where the enclosure does RAID rather than mirror or EC). Thus, there is an expanded set of data at the datacenter level. The number of speculative codewords will similarly increase because combinations of failures from both the enclosures, SSD_RAIDs, and interior RAIDs themselves expand by a factor equal to the number of SSDs contributing to the data protection scheme.

While this example at the enclosure layer 370 of FIG. 3A is described as a mirror implementation, the flow of FIG. 5A is similar for a cross-enclosure protection scheme of RAID implemented at layer 370 by an entity such as the entity labeled as Erasure Code 350. Generally erasure codes are formulated to tolerate an increased level of component failure (in this case, enclosure failures). Therefore, dependent upon which EC is implemented, further read_raw and read_raw_extended activity would be triggered, and speculative retries would continue to be constructed by the contributing failed codeword differences.

FIG. 6 illustrates a process flow diagram of a method 600 for use at a data center (or multiple data centers), in accordance with various embodiments. Method 600 incorporates, and is thus a superset of, method 500 of FIG. 5, in accordance with various embodiments. The example data center(s) include one or more replication or coding schemes, and, in embodiments, method 600 is applied as an additional means to provide data durability. With reference to FIG. 6, method 600 is shown as including blocks 610 through 660. In alternate embodiments, method 600 may be implemented in more or less blocks.

Beginning at block 610, customer data is uploaded to the data center. From block 610, method 600 proceeds to blocks 620 and 625, in parallel. At block 620 the customer data is sliced or sharded according to an erasure coding scheme (or, as noted above, an alternative protection scheme). In parallel, at block 625, the uploaded customer data is replicated within or across one or more data centers.

From both blocks 620 and 625, method 600 proceeds to block 630, where the customer data, now processed and uploaded, is monitored and scanned to detect any read uncorrectable events across all of the stored data objects. This is, in embodiments, essentially a read of all of the newly uploaded customer data. From block 630, method 600 proceeds to query block 640, where it is determined if a read uncorrectable has been detected.

If "Yes" at query block 640, then method 600 proceeds to block 650, where blocks 520 through 570 of method 500, illustrated in FIG. 5, are performed for each detected read uncorrectable event. Thus, it is noted that block 520 of FIG. 5 begins at the point where, as here, at a "Yes" response to query block 640, a read uncorrectable indication has been received by a host. Block 650 is thus the portion of method 600 that incorporates method 500, as noted above.

Continuing with reference to FIG. 6, if, however, the response to query block 640 is a "No", then the customer data is all stored accurately, and method 600 proceeds to block 660, where method 600 ends. Similarly, from block 650, after block 570 of method 500 of FIG. 5 has been performed, any errant bits that were detected in response to the "Yes" at query block 640 have now been reconstructed or corrected, and method 600 also proceeds to block 660, and ends. FIG. 7 illustrates a process flow diagram of a method 700 which is also an extended version of method 500 of FIG. 5, in accordance with various embodiments.

Method 700 of FIG. 7 refers to using RAID stripe data to correct a read uncorrectable event when method 400 of FIG. 4, by itself, operating at the LBA level of data, does not correct the errant bits. To include data such as an entire RAID stripe within an SSD, in embodiments, another command, which is an extension of the read_raw command, is used. This is briefly described prior to describing FIG. 7.

As noted above, in embodiments, the new commands of read_raw and write_raw may be added to the NVMe or Open Channel specifications, or to related specifications, to enable the presently disclosed modes of error management in future designs.

Additionally, as noted briefly above, embodiments according to the present disclosure may further include a read_raw_extended command to include data such as an entire RAID stripe within a SSD, to thereby enable correction of data of larger sizes than a logical block, by leveraging replicated data at other nodes in an erasure coded or replicated hyperscale environment. This allows, in embodiments, reconstruction of data of various sizes, rather than only that of a logical block. In embodiments, such reconstructed data may be written back to errant SSD(s) in an erasure coding span, or replication scheme in similar fashion as described above. Thus, in the case of a SSD design without internal XOR/RAID protection, an appropriate size/chunk of data from within errant SSD(s) may be used with read_raw_extended, read_raw, and write_raw commands, in various embodiments, to enable data correction upon the occurrence of a read uncorrected event. Such embodiments may be applied, for example, to future Open Channel-like and/or Zoned Name Spaces (ZNS) designs and protocols of SSDs.

Thus, while hyperscale data center replication and erasure coding schemes may be proprietary to respective operators, embodiments according to the present disclosure may be applied as an additional means for achieving data durability, and thus, applied parallel to existing schemes for achieving current or higher levels of data durability in data centers, and/or provide an additional means for achieving high data durability for future designs of economical SSDs.

Continuing now with reference to FIG. 7, method 700 is shown as including blocks 710 through 755. In alternate embodiments, method 700 may be implemented in more or less blocks. The first two blocks of method 700 set the context in which method 700 operates. Thus, method 700 begins at block 710 where a fail at an optional RAID at a host bus adapter (HBA) and enclosure level fails.

It is noted that to understand the context of FIG. 7, it is understood that at the point where method 700 begins, at block 710, several other low probability failures have already occurred concurrently. These include several steps to correct the errant bits even prior to applying method 500 of FIG. 5A. It may also be assumed that the various measures illustrated in FIG. 4 had already been taken, to no avail. For example, data and ECC metadata were read from media, and the ECC/EDC engine failed to error correct. Soft reads were performed to see if it could be determined which bits represent broader line errors, and then those bits speculatively retried to be decoded with the bits flipped following the soft reads. In parallel, or even prior to the soft reads and read retries being performed, a RAID recovery inside the drive was attempted, but also failed to recover data. In detail, such a failure of the RAID recovery means that each of the following sub-steps also failed: (a) read from all the other dies contributing to the XOR in terms of their Erase Block, Word Line, and Page locations corresponding to the same errant chunk of data, (b) use of the ECC/EDC engine to correct their errors, and (c) noting the locations that failed to correct. It is noted that the notation of the ones that failed to correct more particularly included (i) identification if they were invalid data because the data was re-written by the host and was ready to be erased without being garbage collected, or (ii) if they were valid, determining the host LBA, and directing the host to re-write the host data from another mirror where that data is still correct.

At this point, following all of the above-described failed attempts, a read uncorrectable was returned by the drive. FIG. 7 begins at this point in time, at block 710. It is here noted that this is another point where techniques according to the present disclosure may be implemented at the enclosure level, where the HBA may be asked which other RAID data contributed. In one embodiment, another mirror at block 725 may help the given HBA finally recover.

From block 710, method 700 proceeds to block 720, where the method of FIG. 5 is performed. From block 720 method 700 proceeds to query block 725, where it is determined whether method 500 worked, and was able to correct the errant bits. If a "Yes" is received in response to query block 725, then method 700 proceeds to block 730 and ends. If, however, the response at query block 725 is "No", then method 700 proceeds to block 740.

From this point forward, techniques of embodiments according to the present disclosure are also applied to a RAID rebuild of contributing data. Thus, at block 740, in an echo of block 710, method 700 determines which other data fails have occurred in the HBA/enclosure level RAID. From block 740, method 700 proceeds to block 745, where uncorrectable data from the other mirrors comprising the HBA/enclosure RAID is read, and is then written back down to the HBA/enclosure RAID.

It is here noted that FIG. 3A sets forth one exemplary embodiment of the operation flow of method 700 of FIG. 7. However, it is further noted that erasure codes are a very broad category of data protection schemes, which generally enable the loss of multiple shards or data fragments by adding EC generated shards. Thus, the broadest definition of EC may be simplified into numerous implementations, and of those implementations standard HBA RAID types RAID0, RAID1, RAID4, RAID5, RAID6, and RAID10 are commonly found in deployment. Examples in this disclosure focus on RAID5 which uses XOR to protect the data. Further, it should also be noted that RAID0 is a mirror and is the most derivative implementation of the larger RAID possibilities, and further expanded and most inclusive EC, families of data protection.

From block 745, method 700 proceeds to block 750, where the HBA/enclosure RAID is retriggered to perform another reconstruction. Following this additional attempt at reconstruction, from block 750, method 700 proceeds to query block 755, where it is determined if the uncorrectable data has been regenerated at block 750. If the response at query block 755 is "Yes", then method 700 terminates at end block 760.

If, however, the response at query block 755 is "No", then method 700 proceeds to block 770, where the same principle is applied at the drive level. Thus, at block 770, the drive is queried for the list of all of the other valid drives (as described above in connection with the context of method 600) that failed to error correct, and those are then read from other sources in the data center, and written back into the drive. Finally, in-drive RAID regeneration is again requested.

It is noted that at block 770 when the other sources are read from the data center, if needed, their own processing of blocks 710 through 750 may be performed, respectively, for each such source. It is finally noted that if there are no dies with invalid data amongst those that failed to error correct (e.g., during an attempted RAID recovery no invalid data due to overwrite by host and prior to garbage collection was identified) then the in-drive RAID regeneration is likely to succeed once the drive is advised as to the correct data on the other LBAs.

It is noted that, in connection with method 700, in embodiments each RAID stripe inside a drive is constructed of host data for different LBAs. One of them in the RAID stripe is the one focused on, and it is this data that is failing along with some other contributor to the RAID rebuild. Thus, if the list of contributing LBAs in the RAID rebuild is preserved, in embodiments, the other one that is failing may be determined. As a result, it is only necessary to correct that particular LBA. Thus, in embodiments, a query is sent to the enclosure level host regarding a failing LBA. The host is requested to provide the correct data for that LBA from somewhere else, and the host obtains it from another source or from a higher level recovery.

Once the correct data form the other location is given to the drive, the drive then knows the secondary failure in the RAID rebuild, and proceeds to place the correct data there. As a result, the RAID rebuild has only a single failure, which is precisely the target failure of concern. This time the RAID rebuild succeeds due to a resolution of the previously contributing failure. As a result, the desired target data is obtained.

Thus, in embodiments, the data reliability problem may be solved using methodical host-assisted correction. Embodiments according to the present disclosure may be embodied in, or as part of, a future standard.

Accordingly, in embodiments, high data durability may be achieved by host-assisted leveraging of replicated data and/ or erasure coding redundancy. Embodiments according to the present disclosure utilize the new commands: "Read_raw" and "Write_raw.'" According to some embodiments, these may be added to the NVMe standard and/or open-channel/ZNS related standards to enable error management in future designs.

In embodiments, upon encountering an uncorrectable bit error event, a host may use a "Read_raw" command to obtain data and metadata, for example, ECC metadata, of the block associated with the uncorrectable error and log the block's address. The host then compares the uncorrectable data along with ECC data by pulling same blocks on other hosts in the data center's replicated or erasure coded system, to deduce the relevant specific bits in error. Thereafter the host attempts to correct the errant bits using ECC/EDC and other host data of blocks. Even if all the copies of the same blocks are corrupted, this mechanism may still achieve a successful in recovery based on a read_raw_extended and/or guided and intelligent speculative retries. Thereafter, the host sends the corrected block's predicted data to the errant host by using a "write_raw" command that includes corrected data and new error correction metadata. The host reads the relevant data back to validate its correctness, and rewrites the constructed/corrected data to other hosts in the data centers, if necessary.

A method of error management for data storage devices, such as solid-state storage devices (SSDs), includes, in response to a read request for first data from a first storage device of a plurality of storage devices under one or more common data protection schemes, receiving a read uncorrectable indication regarding the first data, issuing a read_raw command to obtain uncorrected data and metadata of the logical block address (LBA) associated with the first data, and obtaining the same LBA, or the same first data stored at another LBA, from one or more other storage devices of the plurality of storage devices. The method further includes comparing the uncorrected data with the data and metadata from the other storage devices, and speculatively modifying the uncorrected data based at least in part on the other data to create a set of reconstructed first data codewords. The method still further includes, in response to a determination that one of the reconstructed first data codewords has recovered the first data, issuing a write_raw command to rewrite the modified data and associated metadata to the first storage device.

In one embodiment, the method further includes reading the corrected data at the first storage device to verify that the corrected data is there.

In one embodiment, the method further includes reading a buffer that uses a same read path as is used for a media read recovery.

In one embodiment, the method further includes rewriting the modified data and metadata to at least one of: one or more other storage devices of the plurality of storage devices; or a RAM buffer.

In one embodiment, comparing the first data with the data and metadata from the one or more other storage devices further includes deducing specific bits of the LBA that are in error.

In one embodiment, the method further includes that the plurality of storage devices are disposed in a data center, and together comprise at least one of a RAID protected, erasure coded or replicated system.

In one embodiment, the method further includes, in response to a determination that the first data cannot be corrected at the LBA level, issuing an "read_raw_extended" command to obtain data and metadata having a size larger than a logical block that is associated with the first data, from one or more other storage devices of the plurality.

In one embodiment, the method still further includes, in response to the read_raw_extended command, obtaining at least one of a full redundant array of inexpensive drives (RAID) stripe of data or some or all of an entire erasure code block.

In one embodiment, speculatively modifying the uncorrected data further includes characterizing the error modes of the other storage devices and using that characterization to make a best guess as to the actual values of erroneous bits of the first data.

In one embodiment, speculatively modifying the uncorrected data further includes obtaining multiple versions of the LBA of the first data, and applying one of a voting scheme or a weighted voting scheme to the multiple versions.

In one embodiment, speculatively modifying the uncorrected data further includes determining if the data from the one or more other storage devices of the plurality of storage devices uses the same HLBAs as the first storage device, and, in response to a determination that they do, the method still further includes including reconstructed first data codewords where ECC bits of the uncorrected data are modified in addition to bits of user data.

A non-volatile storage device includes a storage device host configured to receive a read uncorrectable event response for a first codeword (CW) stored in the storage device and issue a read_raw command for the CW and a read_raw extended command for each of other CWs protected in a data protection stripe that includes the first CW. The host is further configured to construct a pseudo_read_raw result for the first CW from each of the other CWs and the data protection stripe, and, using the pseudo_read_raw result, construct a set of possible replacement CWs for the first CW and push one or more elements of the set to the storage device.

In one embodiment, the data protection stripe is an XOR stripe.

In one embodiment, the storage device host is further configured to determine if one of the one or more elements of the set of possible replacement CWs recovered original data of the first CW, and in response to a determination that the original data of the first CW is recovered, to issue a write_raw command to rewrite the corrected first CW to the storage device.

In one embodiment, the storage device host is further configured to, in response to a determination that the original data of the first CW is not recovered, identify a second CW of the other CWs protected in the data protection stripe that protects the first CW, construct a pseudo_read_raw result for the second CW from each of the other CWs and the data protection stripe, and, using the pseudo_read_raw result for the second CW, construct a set of possible replacement CWs for the second CW and push one or more elements of the set to the storage device.

In another embodiment, the storage device host is further configured to, in response to a determination that the original data of the second CW is also not recovered, proceed to even higher levels of a data hierarchy of which the data storage device is a part, leveraging layers of data protection at each level, to recover the first CW and the second CW.

An apparatus includes means for receiving an indication of uncorrectable data in response to a read command regarding first data stored on a first SSD of a first data center, means for issuing a read_raw command to obtain data and metadata of one or more LBAs in which the uncorrectable data is stored, and means for issuing a read_raw_extended command to obtain the data and metadata of the one or more LBAs, or the same first data stored at one or more other LBAs from one or more other SSDs ("other data"), the other SSDs being either in the first data center or in other data centers, wherein the first and the other data centers are part of at least one of a RAID protected, erasure coded, or replicated system. The apparatus still further includes means for speculatively correcting the first data using the other data, and means for issuing a write_raw command to re-write the speculatively corrected data to the first SSD, in response to receiving an indication that the speculatively corrected data recovered the first data.

In one embodiment, the apparatus' means for speculatively correcting further comprises means for characterizing the error modes of the first SSD, and means for using an error mode characterization to make a best guess as to the actual values of the first data.

In one embodiment, the means for using an error mode characterization further comprises means for making a prioritized ordering of possible values of the best guess.

While the foregoing is directed to embodiments of the present disclosure, other and further embodiments of the disclosure may be devised without departing from the basic scope thereof, and the scope thereof is determined by the claims that follow.

What is claimed is:

1. A method of error management for data storage and solid-state storage devices (SSDs), the method comprising:
in response to a read request for first data from a first storage device of a plurality of storage devices under one or more common data protection schemes, receiving a read uncorrectable indication regarding the first data;
issuing a read_raw command to obtain uncorrected data and metadata of a logical block address (LBA) associated with the first data;
obtaining the same LBA, or the same first data stored at another LBA, from one or more other storage devices of the plurality of storage devices, wherein issuing the read_raw command further comprises retrieving and characterizing at least one of:
an error mode of the first storage device;
an error mode for a customer who sent the first data that was written to the first storage device;
an error mode of the one or more other storage devices;
a setting of a NAND storing the first data of the first storage device; and
a setting of another NAND of the one or more other storage devices;
comparing the uncorrected data with the same LBA, or the same first data stored at the another LBA, from the one or more other storage devices and the metadata of the same LBA, or the same first data stored at the another LBA, from the one or more other storage devices;
speculatively modifying the uncorrected data based at least in part on the same LBA, or the same first data stored at the another LBA, from the one or more storage devices to create a set of reconstructed first data codewords; and
in response to a determination that one of the reconstructed first data codewords has recovered the first data, issuing a write_raw command to rewrite the speculatively modified uncorrected data and associated metadata to the first storage device.

2. The method of claim 1, further comprising:
in response to a determination that the reconstructed first data codewords cannot recover the first data, obtaining the same LBA, or the same first data stored at the another LBA, from one or more additional other storage devices of the plurality.

3. The method of claim 1, further comprising reading the speculatively modified uncorrected data at the first storage device to verify that the first data is corrected.

4. The method of claim 3, further comprising reading a buffer that uses a same read path as is used for a media read recovery.

5. The method of claim 1, further comprising rewriting the modified data and metadata to at least one of:
one or more other storage devices of the plurality of storage devices; or
a random-access memory (RAM) buffer.

6. The method of claim 1, wherein comparing the first data with the data and metadata from the one or more other storage devices further includes deducing specific bits of the LBA that are in error.

7. The method of claim 1, wherein the plurality of storage devices are disposed in a data center, and together comprise at least one of a redundant array of independent discs (RAID) protected, erasure coded or replicated system.

8. The method of claim 1, further comprising:
in response to a determination that the first data cannot be corrected at an LBA level, issuing a read_raw_extended command to obtain data and metadata having a size larger than a logical block that is associated with the first data, from one or more other storage devices of the plurality.

9. The method of claim 8, further comprising:
in response to the read_raw_extended command, obtaining at least one of a full redundant array of inexpensive drives (RAID) stripe of data or some or all of an entire erasure code block.

10. The method of claim 1, wherein speculatively modifying the uncorrected data further comprises:
using the characterization to make a best guess as to an actual value of erroneous bits of the first data.

11. The method of claim 1, wherein speculatively modifying the uncorrected data further comprises:
obtaining multiple versions of the LBA of the first data; and
applying one of a voting scheme or a weighted voting scheme to the multiple versions.

12. The method of claim 1, wherein speculatively modifying the uncorrected data further comprises:
determining if the data from the one or more other storage devices of the plurality of storage devices uses the same host logical block addresses (HLBAs) as the first storage device; and
in response to a determination that they do, including reconstructed first data codewords where error correction code (ECC) bits of the uncorrected data are modified in addition to bits of user data.

13. A non-volatile data storage device, comprising:
a storage device host configured to:
receive a read uncorrectable event response for a first codeword (CW) stored in the storage device;
issue a read_raw command for the first CW and a read_raw_extended command for each of other CWs protected in a data protection stripe that includes the first CW, wherein issuing the read_raw command further comprises retrieving and characterizing at least one of:
an error mode of the storage device;
an error mode for a customer who sent the first CW that was written to the storage device;
an error mode of one or more other storage devices;
a setting of a NAND storing the first CW of the storage device; and
a setting of another NAND of the one or more other storage devices;
construct a pseudo_read_raw result for the first CW from each of the other CWs and the data protection stripe; and
using the pseudo_read_raw result, construct a set of possible replacement CWs for the first CW and push one or more elements of the set to the storage device.

14. The non-volatile data storage device of claim 13, wherein the data protection stripe is an exclusive-or (XOR) stripe.

15. The data storage device of claim 13, wherein the storage device host is further configured to:
determine if one of the one or more elements of the set of possible replacement CWs or the first CW is original data that is recovered; and
in response to a determination that the original data of the first CW is recovered, issue a write_raw command to rewrite a corrected first CW to the storage device.

16. The data storage device of claim 15, wherein the storage device host is further configured to:

in response to a determination that the original data of the first CW is not recovered:
identify a second CW of the other CWs protected in the data protection stripe that protects the first CW;
construct a pseudo_read_raw result for the second CW from each of the other CWs and the data protection stripe; and
using the pseudo_read_raw result for the second CW, construct a set of possible replacement CWs for the second CW and push one or more elements of the set to the storage device.

17. The data storage device of claim 16, wherein the storage device host is further configured to:
in response to a determination that the original data of the second CW is also not recovered, proceed to even higher levels of a data hierarchy of which the data storage device is a part, leveraging layers of data protection at each level, to recover the first CW and the second CW.

18. An apparatus, comprising:
means for receiving an indication of uncorrectable data in response to a read command regarding first data stored on a first solid state drive (SSD) of a first data center;
means for issuing a read_raw command to obtain data and metadata of one or more logical block addresses (LBAs) in which the uncorrectable data is stored;
means for issuing a read_raw_extended command to obtain the first data and metadata of one or more LBAs from one or more other SSDs ("other data"), the other SSDs being either in the first data center or in other data centers, wherein the first data center and other data centers are part of at least one of a redundant array of independent discs (RAID) protected, erasure coded, or replicated system, wherein the means for issuing a read_raw command and the means for issuing a read_raw extended command further comprises means for retrieving and means for characterizing at least one of:
an error mode of the first SSD;
an error mode for a customer who sent the first data that was written to the first SSD;
an error mode of the one or more other SSDs;
a setting of a NAND storing the first data of the first SSD; and
a setting of another NAND of the one or more other SSDs;
means for speculatively correcting the first data using the other data; and
means for issuing a write_raw command to re-write the speculatively corrected data to the first SSD, in response to receiving an indication that the speculatively corrected data recovered the first data.

19. The apparatus of claim 18, wherein the means for speculatively correcting further comprises:
means for using the means for characterizing to make a best guess as to an actual value of the first data.

20. The apparatus of claim 19, further comprising means for making a prioritized ordering of possible values of the best guess.

* * * * *